(12) United States Patent
Hurley

(10) Patent No.: US 11,488,138 B2
(45) Date of Patent: Nov. 1, 2022

(54) INITIATION OF ONLINE PAYMENTS USING AN ELECTRONIC DEVICE IDENTIFIER

(71) Applicant: Apple Inc., Cupertino, CA (US)

(72) Inventor: Timothy S. Hurley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 603 days.

(21) Appl. No.: 14/503,246

(22) Filed: Sep. 30, 2014

(65) Prior Publication Data
US 2015/0095219 A1    Apr. 2, 2015

Related U.S. Application Data

(60) Provisional application No. 62/004,182, filed on May 28, 2014, provisional application No. 62/002,721, (Continued)

(51) Int. Cl.
*G06Q 20/32*    (2012.01)
*G06Q 20/40*    (2012.01)
(Continued)

(52) U.S. Cl.
CPC ........... *G06Q 20/325* (2013.01); *G06Q 20/10* (2013.01); *G06Q 20/12* (2013.01);
(Continued)

(58) Field of Classification Search
USPC ..................................................... 705/38–44
See application file for complete search history.

(56) References Cited

U.S. PATENT DOCUMENTS

| | | | |
|---|---|---|---|
| 7,333,615 B1 * | 2/2008 | Jarboe | H04L 9/30 380/277 |
| 7,376,629 B1 | 5/2008 | McIsaac et al. | |

(Continued)

FOREIGN PATENT DOCUMENTS

| | | |
|---|---|---|
| CN | 101295384 A | 10/2008 |
| CN | 102057386 | 5/2011 |

(Continued)

OTHER PUBLICATIONS

Authors et al: Sameer Saxena; Title :Survey on Online Electronic Payments Security; Publisher: IEEE; Date of Conference: Feb. 4-6, 2019; (Year: 2019).*

(Continued)

*Primary Examiner* — Bruce I Ebersman
*Assistant Examiner* — Hatem M Ali
(74) *Attorney, Agent, or Firm* — BakerHostetler

(57) ABSTRACT

Systems, methods, and computer-readable media for conducting payments are provided. In one example embodiment, a commercial entity system, in communication with a merchant subsystem and a payment electronic device, includes at least one processor component, at least one memory component, and at least one communications component, wherein the commercial entity system is configured to receive transaction request data from the merchant subsystem, wherein the transaction request data includes a payment device identifier of the payment electronic device and transaction information related to a transaction, transmit payment request data to the payment electronic device, wherein the payment request data includes at least a portion of the transaction information of the received transaction request data, receive payment card data from the payment electronic device based on the transmitted payment request data, and transmit at least a portion of the received payment (Continued)

card data to the merchant subsystem. Additional embodiments are also provided.

20 Claims, 9 Drawing Sheets

Related U.S. Application Data filed on May 23, 2014, provisional application No. 61/989,107, filed on May 6, 2014, provisional application No. 61/884,926, filed on Sep. 30, 2013.

(51) Int. Cl.
    *G06Q 20/38*     (2012.01)
    *G06Q 20/12*     (2012.01)
    *G06Q 20/10*     (2012.01)

(52) U.S. Cl.
    CPC ..... *G06Q 20/3227* (2013.01); *G06Q 20/3278* (2013.01); *G06Q 20/382* (2013.01); *G06Q 20/3823* (2013.01); *G06Q 20/3829* (2013.01); *G06Q 20/40* (2013.01)

(56) References Cited

U.S. PATENT DOCUMENTS

| | | |
|---|---|---|
| 2008/0319914 A1 | 12/2008 | Carrott |
| 2011/0161671 A1* | 6/2011 | Whitehouse ........ G06F 21/6236 |
| | | 713/150 |
| 2012/0130839 A1* | 5/2012 | Koh ................... G06Q 20/352 |
| | | 705/26.1 |
| 2012/0143770 A1 | 6/2012 | Pauker et al. |
| 2012/0215693 A1* | 8/2012 | Faith ...................... G06Q 20/02 |
| | | 705/44 |
| 2012/0284187 A1* | 11/2012 | Hammad ............... G06Q 20/20 |
| | | 705/44 |
| 2012/0300932 A1 | 11/2012 | Cambridge et al. |
| 2014/0019367 A1* | 1/2014 | Khan .................... G06Q 30/06 |
| | | 705/75 |
| 2014/0052553 A1* | 2/2014 | Uzo .................... G06Q 20/204 |
| | | 705/18 |
| 2014/0279546 A1* | 9/2014 | Poole ................... G06Q 30/06 |
| | | 705/44 |

FOREIGN PATENT DOCUMENTS

| | | |
|---|---|---|
| CN | 102609837 A | 7/2012 |
| KR | 10-2004-0091063 | 10/2004 |
| KR | 10-2012-0108599 | 10/2012 |
| KR | 10-2013-0082656 | 7/2013 |
| KR | 10-2013-0100872 | 9/2013 |
| TW | M418352 | 12/2011 |
| TW | 201227557 | 7/2012 |
| WO | 00/79367 A1 | 12/2000 |
| WO | 01/59731 | 8/2001 |
| WO | 2013/067521 A2 | 5/2013 |

OTHER PUBLICATIONS

Authors; Yongqiang He et al: Title: Research on online payment mode of e-commerce; Publisher: IEEE; Date of Conference: Jul. 16-18, 2010; (Year: 2010).*

* cited by examiner

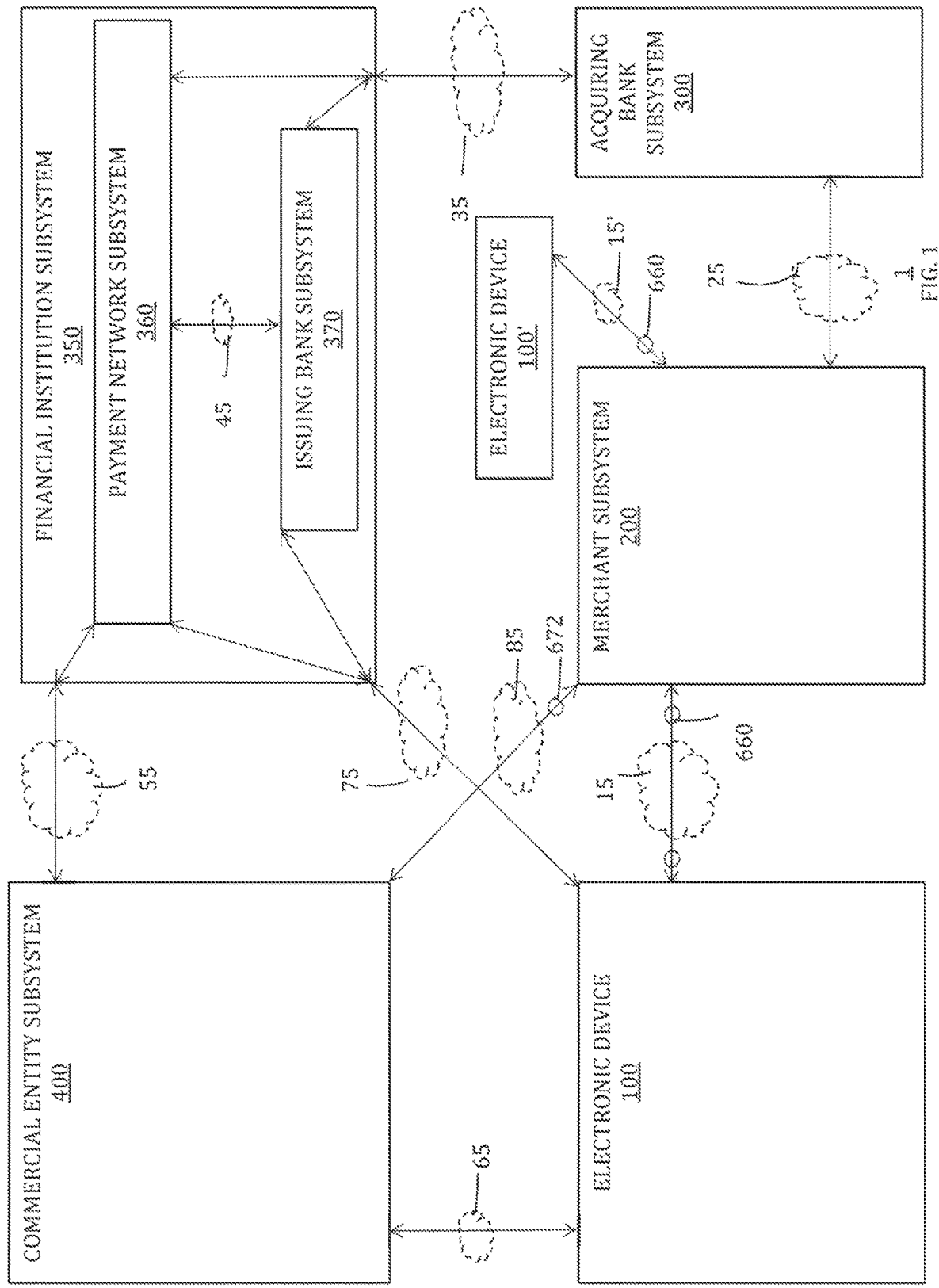

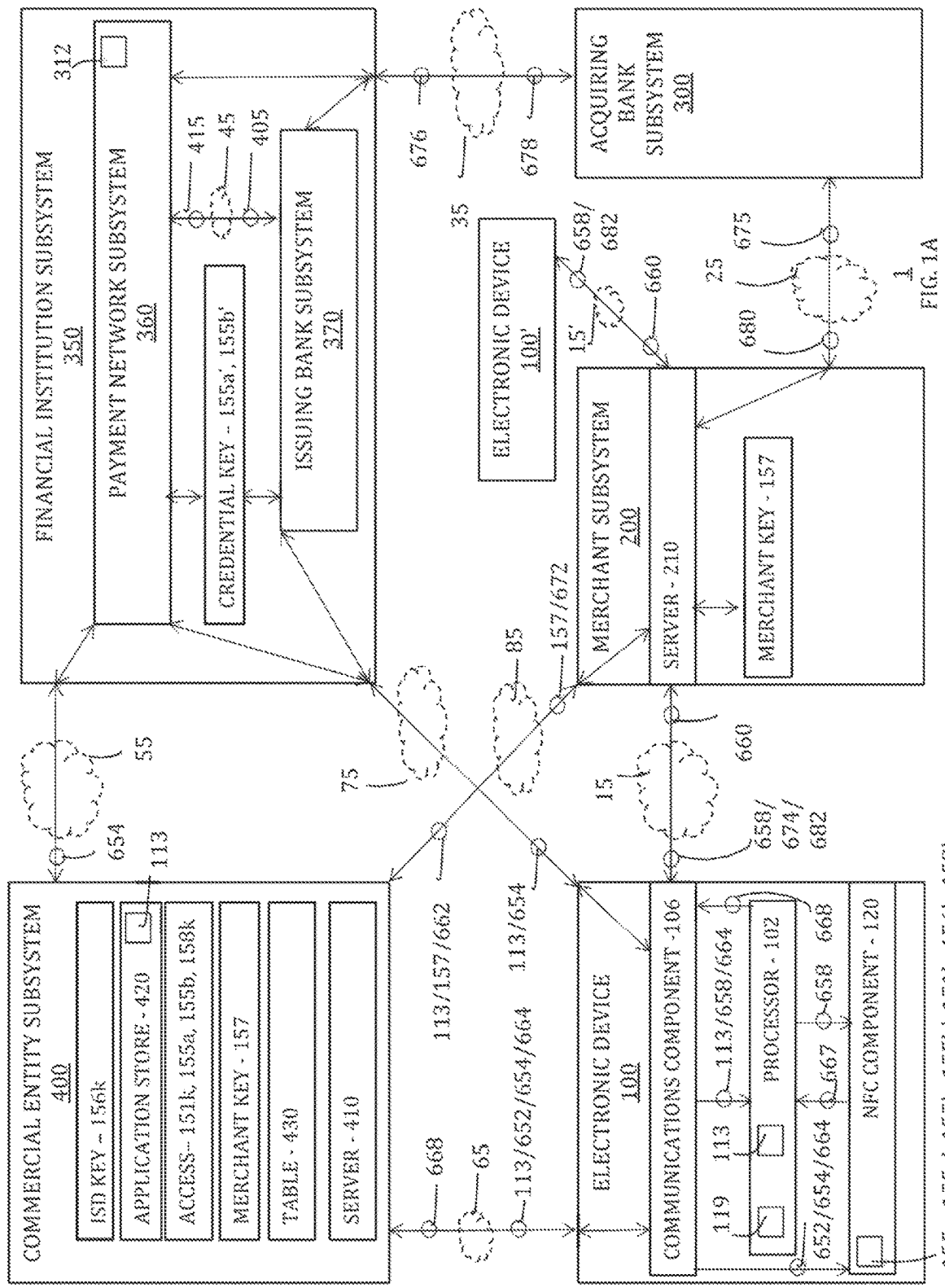

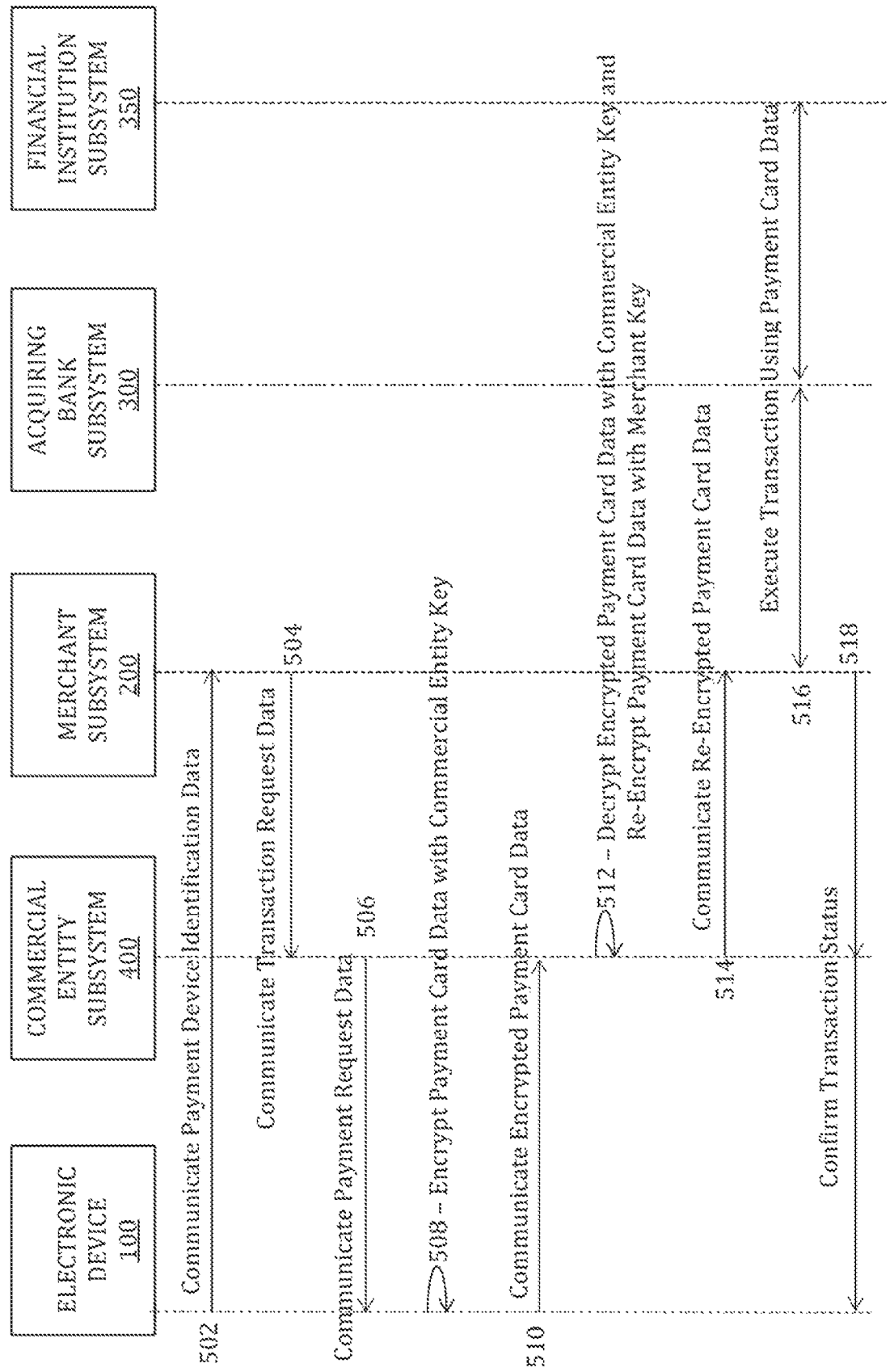

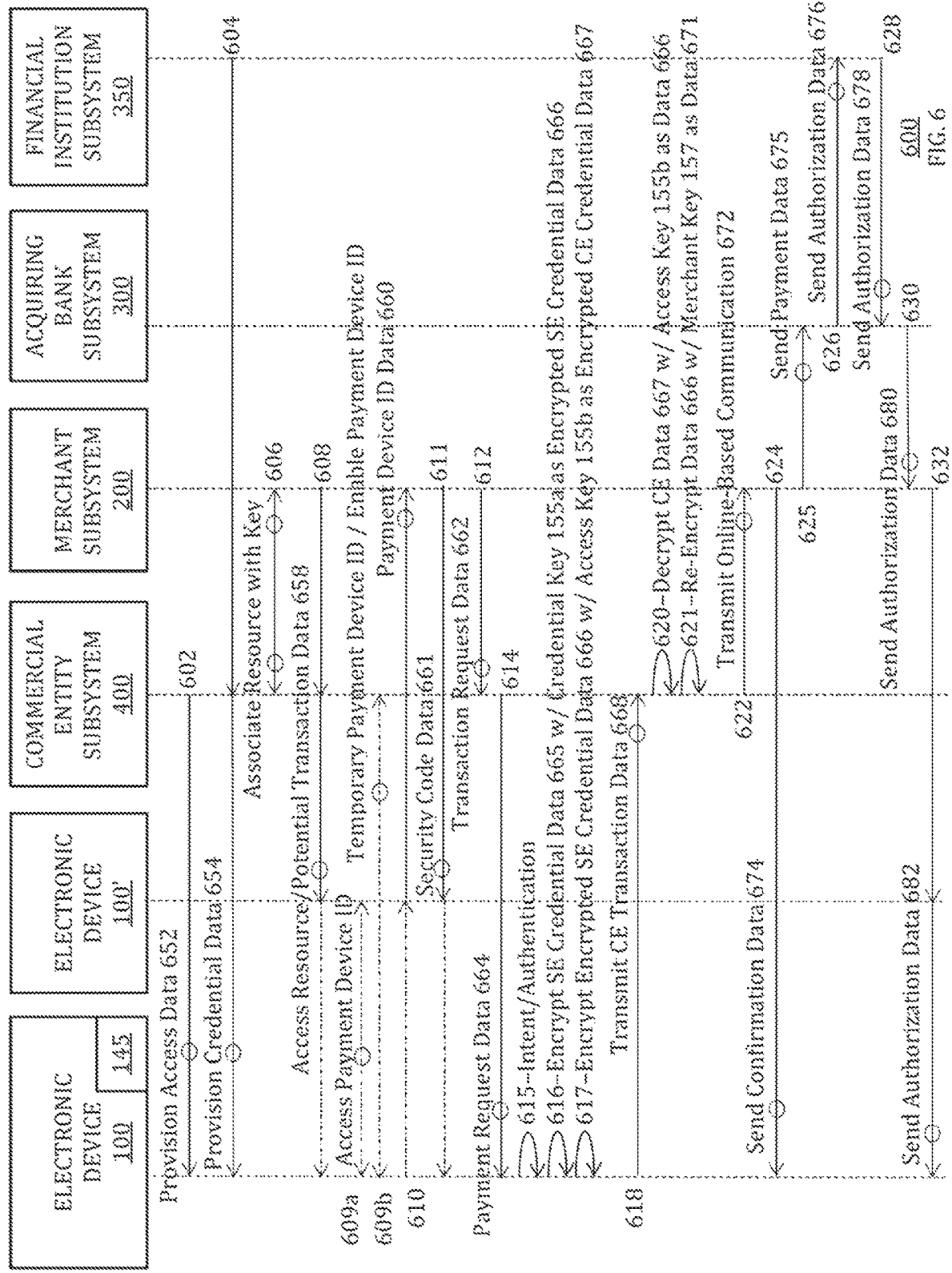

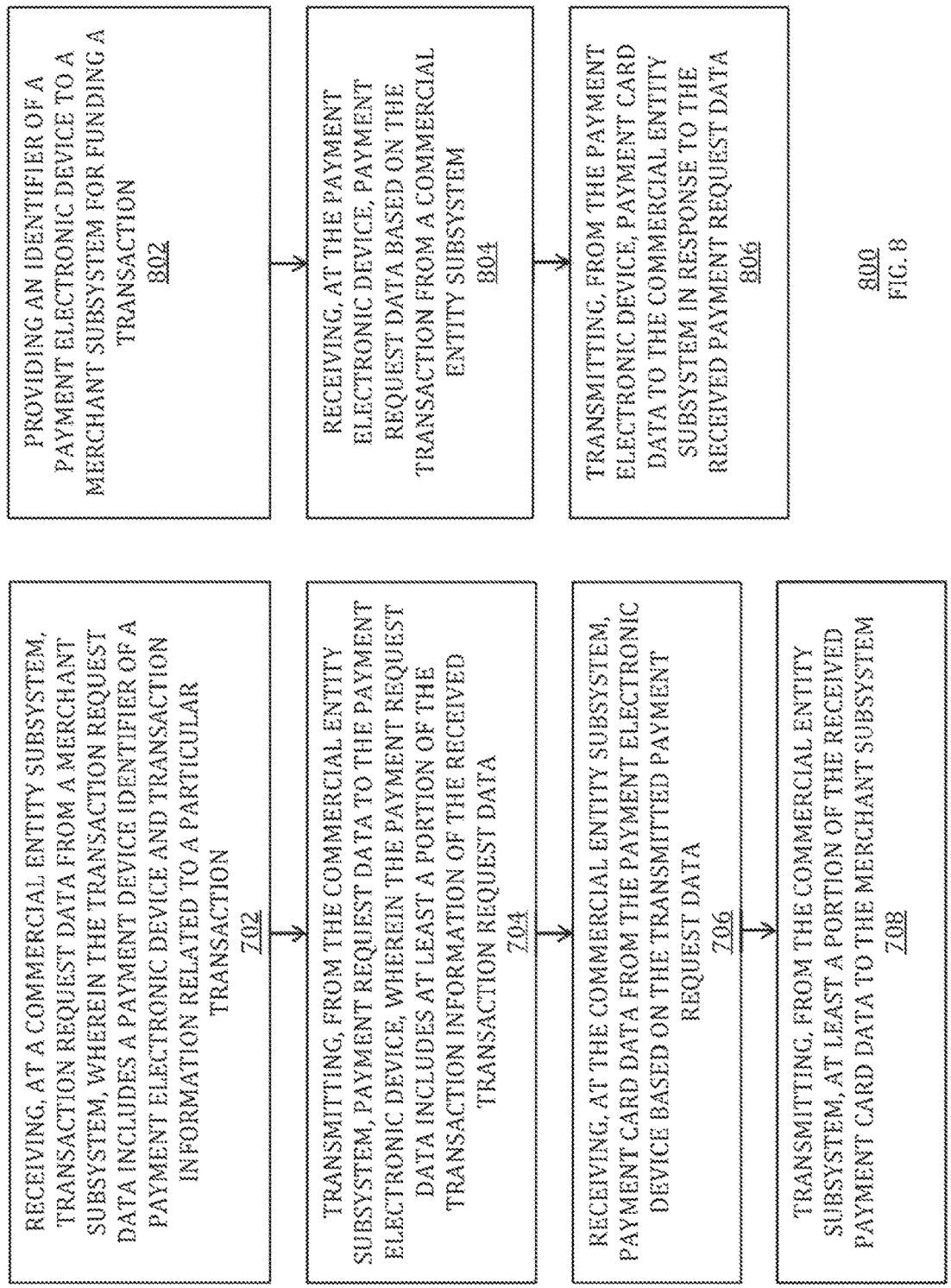

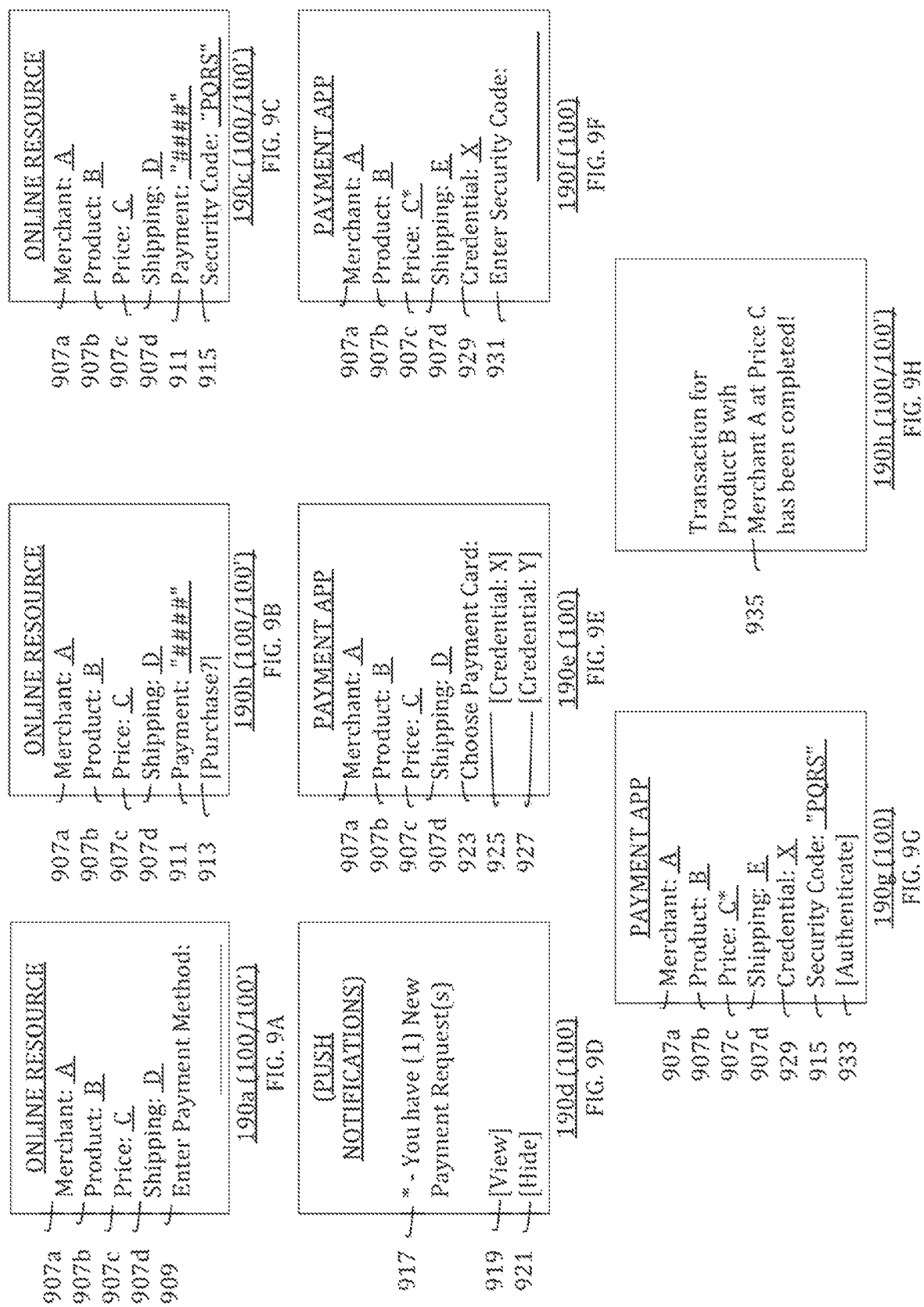

… (1)

INITIATION OF ONLINE PAYMENTS USING AN ELECTRONIC DEVICE IDENTIFIER

CROSS-REFERENCE TO RELATED APPLICATIONS

This application claims the benefit of prior filed U.S. Provisional Patent Application No. 61/884,926, filed Sep. 30, 2013, of prior filed U.S. Provisional Patent Application No. 61/989,107, filed May 6, 2014, of prior filed U.S. Provisional Patent Application No. 62/002,721, filed May 23, 2014, and of prior filed U.S. Provisional Patent Application No. 62/004,182, filed May 28, 2014, each of which is hereby incorporated by reference herein in its entirety.

TECHNICAL FIELD

This disclosure relates to using a device identifier to conduct a payment and, more particularly, to using a device identifier of a payment electronic device to initiate an online payment between the payment electronic device and a merchant subsystem via a commercial entity subsystem.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential, with the other entity in a contactless proximity-based communication. However, secure and convenient use of such a commerce credential by the electronic device for conducting payment of a transaction has heretofore been infeasible.

SUMMARY OF THE DISCLOSURE

This document describes systems, methods, and computer-readable media for using a device identifier to conduct a payment.

As an example, a commercial entity system, in communication with a merchant subsystem and a payment electronic device, may include at least one processor component, at least one memory component, and at least one communications component, wherein the commercial entity system is configured to receive transaction request data from the merchant subsystem, wherein the transaction request data includes a payment device identifier of the payment electronic device and transaction information related to a particular transaction, transmit payment request data to the payment electronic device, wherein the payment request data includes at least a portion of the transaction information of the received transaction request data, receive payment card data from the payment electronic device based on the transmitted payment request data, and transmit at least a portion of the received payment card data to the merchant subsystem.

As another example, a method may include providing an identifier of a payment electronic device to a merchant subsystem for funding a transaction, receiving, at the payment electronic device, payment request data based on the transaction from a commercial entity subsystem, and transmitting, from the payment electronic device, payment card data to the commercial entity subsystem in response to the received payment request data.

As another example, a method may include, at a commercial entity subsystem, receiving transaction request data from a merchant subsystem, wherein the transaction request data includes a payment device identifier of a payment electronic device and transaction information related to a particular transaction, and transmitting payment request data to the payment electronic device, wherein the payment request data includes at least a portion of the transaction information of the received transaction request data.

As yet another example, a non-transitory computer-readable medium may include computer-readable instructions recorded thereon for transmitting, from a payment electronic device, an identifier of the payment electronic device to a merchant subsystem for funding a transaction, receiving, at the payment electronic device, payment request data based on the transaction from a commercial entity subsystem, and transmitting, from the payment electronic device, payment card data to the commercial entity subsystem in response to the received payment request data.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1 is a schematic view of an illustrative system for using a device identifier to conduct a payment;

FIG. 1A is another more detailed schematic view of the system of FIG. 1;

FIGS. 5-8 are flowcharts of illustrative processes for using a device identifier to conduct a payment; and FIGS. 9A-9H are front views of screens of a graphical user interface of the electronic device of FIGS. 1-4 illustrating processes for conducting a payment using a device identifier.

DETAILED DESCRIPTION OF THE DISCLOSURE

Figure 2:
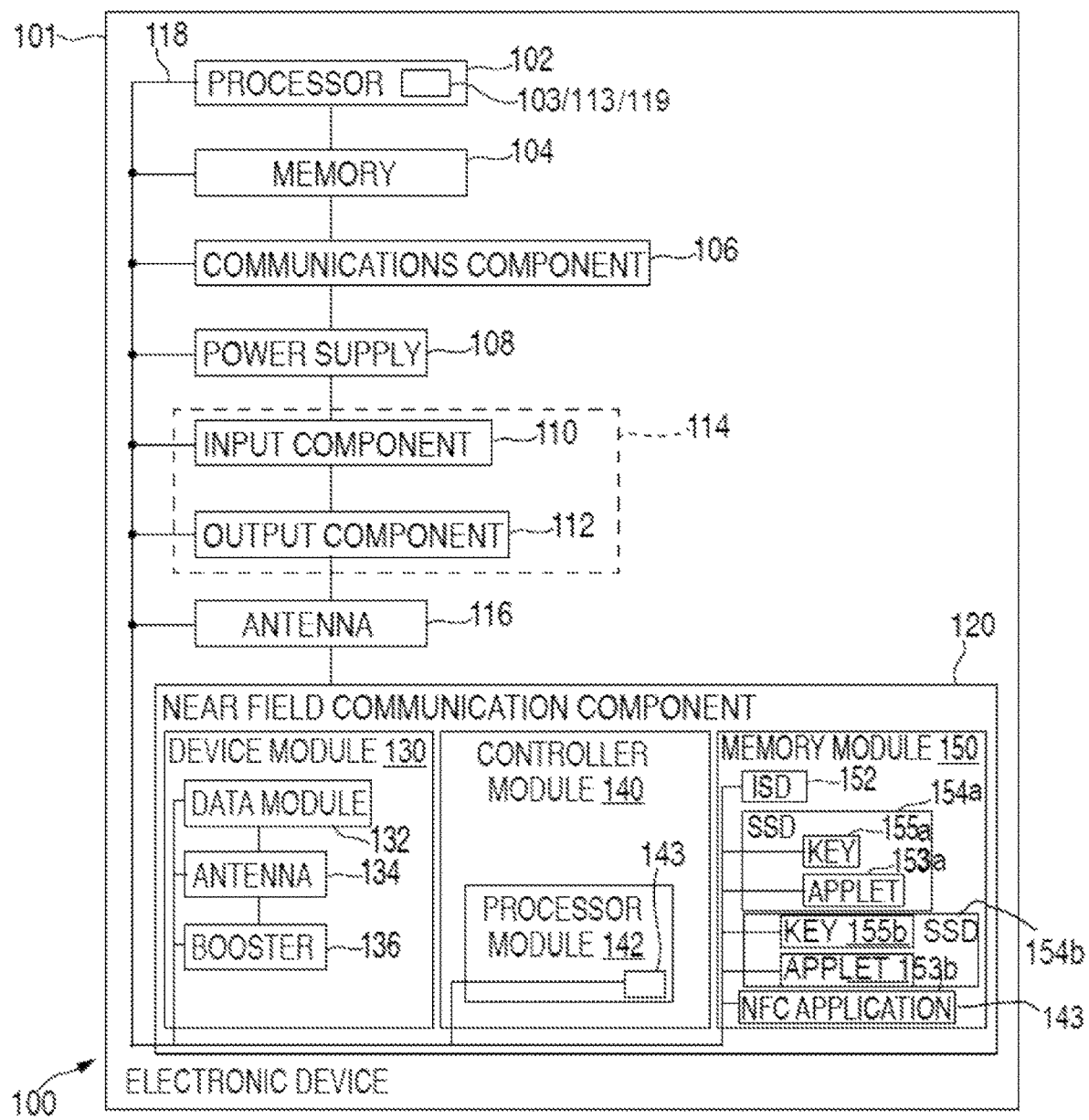
FIG. 2 is a more detailed schematic view of the electronic device of the system of FIGS. 1 and 1A.

A credential provisioned on a secure element of a payment-enabled electronic device may be used for securely conducting an online financial transaction between the payment electronic device and a merchant Such a credential may not be shared directly between the payment device and the merchant Instead, a user may provide to the merchant a payment device identifier of a particular payment device to be used for a particular transaction to be funded, where such a payment device identifier may be any suitable data that may be associated with a payment device (e.g., a telephone number, an e-mail address, a user account log-in identifier, etc.), which may or may not be publicly known and which may be provided in an insecure manner by the user to the merchant (e.g., verbally or via any suitable online communication)). In response, the merchant may send to an intermediary commercial entity a transaction request that is indicative of the transaction to be funded as well as the payment device identifier received from the user. Then, the commercial entity may leverage that payment device identifier to securely contact the payment device to be used for payment (e.g., via a push notification or otherwise) by sending a payment request, which may include any suitable particulars about the transaction. Then, a user of that payment device may select and authenticate a credential of that payment device for use in funding the transaction identified by the payment request. In some embodiments, the credential may be encrypted by the secure element using an access key not available to any non-secure portion of the electronic device. That encrypted credential and information identifying the merchant for a proposed transaction may be transmitted by the electronic device to the commercial entity that may also have access to the access key. The commercial entity may decrypt the received credential data using the access key and may re-encrypt the credential data using a merchant key known by the commercial entity. Such a merchant key may be determined by the commercial entity through use of merchant identification information received from the merchant via the transaction request. The re-encrypted credential data may then be transmitted from the commercial entity to the merchant, and the merchant may decrypt the credential data using the merchant key, which may be known to the merchant. The commercial entity may add a layer of security to the online financial transaction between the electronic device and the merchant. The commercial entity may be privy not only to the access key available at the secure element of the device but also to the merchant key available to the merchant. Therefore, the commercial entity may be in a unique position to manage any online transactions between the secure element of the device and the merchant, while at the same time not being privy to the credential data being used (e.g., as the commercial entity may not have access to a credential key with which the credential data is encrypted by the secure element). The commercial entity may provide an intermediary service that may reduce spam or unwanted payment requests by acting as an intermediary for any payments to be enabled by the payment device. Moreover, by only sharing a payment device identifier with a merchant, a user may not worry about whether the communication of that identifier was secure, as the identifier is unable to fund a transaction itself.

Figure 3:
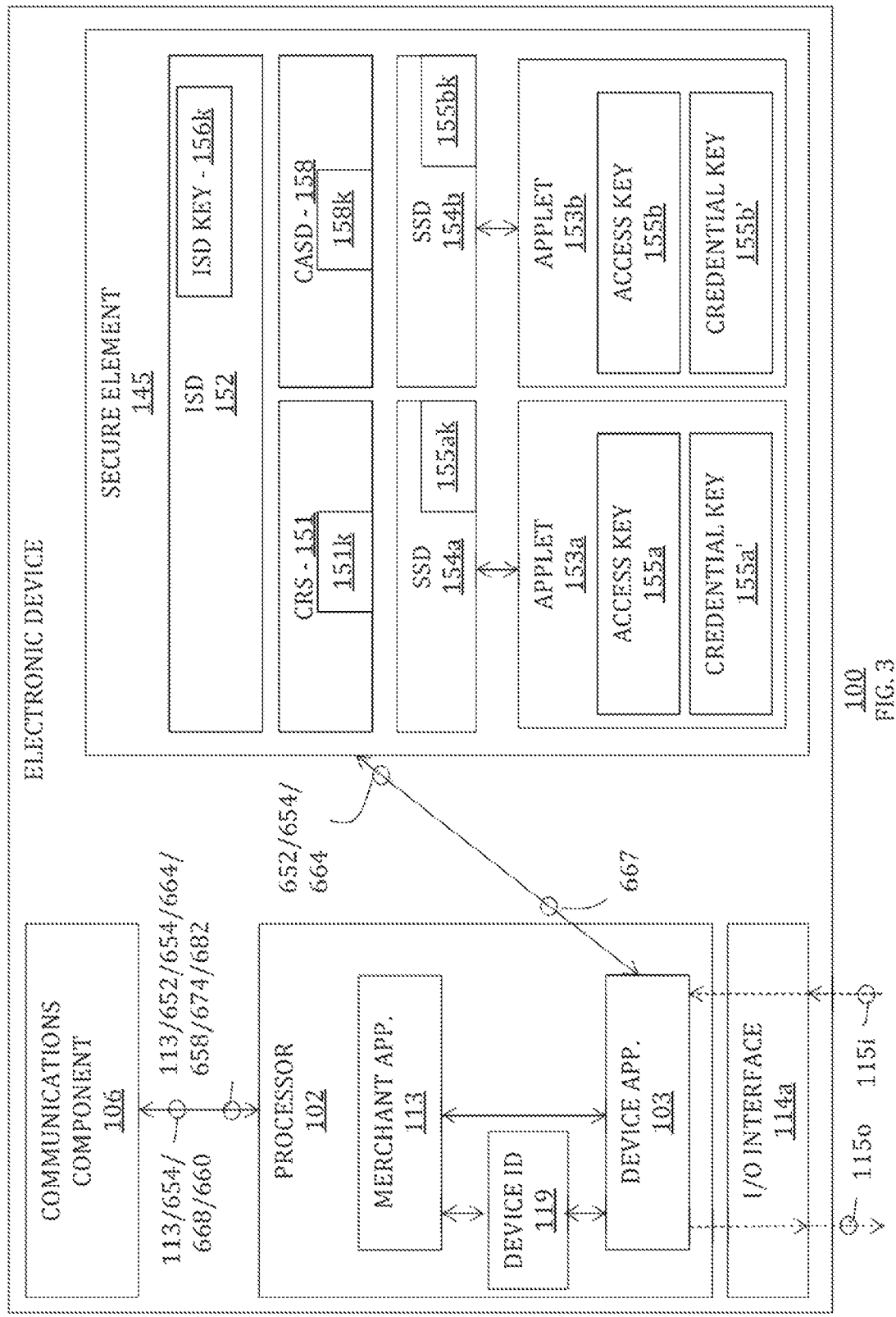
FIG. 3 is another more detailed schematic view of the electronic device of FIGS. 1-2.
Figure 4:
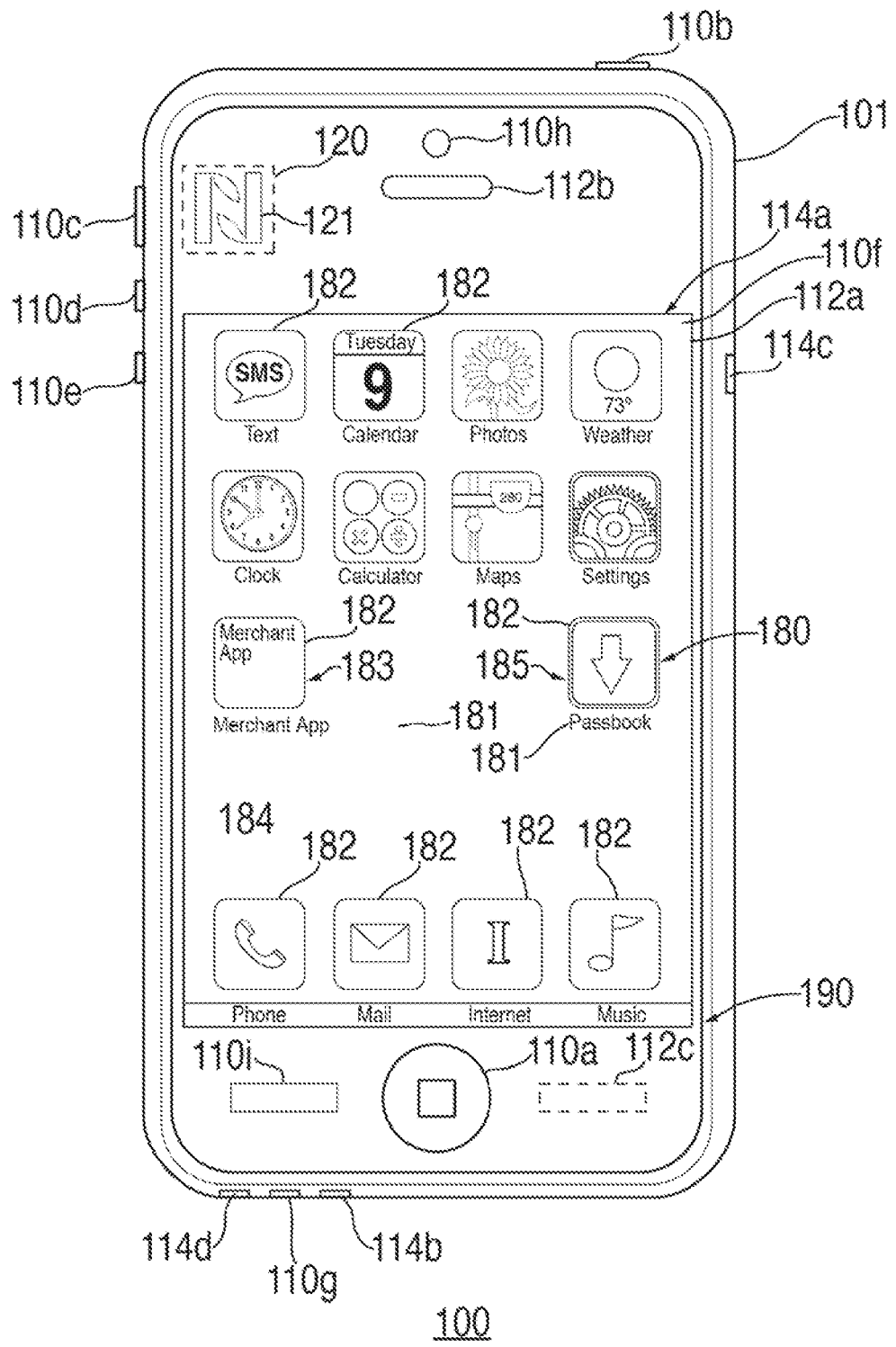
FIG. 4 is a front view of the electronic device of FIGS. 1-3.

FIGS. 1 and 1A show a system 1 in which one or more credentials may be provisioned onto an electronic device 100 from a financial institution subsystem 350 in conjunction with a commercial entity subsystem 400, and in which such credentials may be used by electronic device 100 for conducting an online financial transaction with a merchant subsystem 200 and an associated acquiring bank subsystem 300. FIGS. 2-4 show further details with respect to particular embodiments of electronic device 100 of system 1, FIGS. 5 and 6 are flowcharts of illustrative processes for using a device identifier to initiate an online payment, while FIGS. 9A-9H show example screens 190a-190h that may be representative of a graphical user interface of electronic device 100 during such an online payment.

Description of FIG. 1

FIG. 1 is a schematic view of an illustrative system 1 that may allow for the secure use of a credential on an electronic device in an online financial transaction (e.g., an online payment). For example, as shown in FIG. 1, system 1 may include an end-user electronic device 100 as well as a commercial entity subsystem 400 and a financial institution subsystem 350 for securely provisioning one or more credentials on electronic device 100. Moreover, as shown in FIG. 1, system 1 may also include a merchant subsystem 200 for receiving contactless proximity-based communications (e.g., near field communications) and/or payment device identifier-based communications 660 (e.g., network telecommunications or otherwise) from electronic device 100 and/or online-based communications 672 (e.g., network telecommunications or otherwise) from commercial entity subsystem 400 for enabling payments based on such provisioned credentials between a user of electronic device 100 and a merchant of merchant subsystem 200. System 1 may also include an acquiring bank subsystem 300 that may utilize such contactless proximity-based communications and/or such online-based communications 672 for completing a financial transaction with financial institution subsystem 350. As also shown in FIG. 1, system 1 may also include an additional end-user electronic device 100' for communicating certain payment device identifier-based communications 660 (e.g., network telecommunications or otherwise) to merchant subsystem 200 for enabling such a financial transaction, as described below (e.g., with respect to FIG. 6).

System 1 may include a communications path 15 for enabling communication between device 100 and merchant subsystem 200, a communications path 15' for enabling communication between device 100' and merchant subsystem 200, a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, a communications path 75 for enabling communication between financial institution subsystem 350 and electronic device 100, and a communications path 85 for enabling communication between commercial entity subsystem 400 and merchant subsystem 200. One or more of paths 15, 15', 25, 35, 45, 55, 65, 75, and 85 may be at least partially managed by one or more trusted service managers ("TSMs"). Any suitable circuitry, device, system, or combination of these (e.g., a wireless communications infrastructure that may include one or more communications towers, telecommunications servers, or the like) that may be operative to create a communications network may be used to provide one or more of paths 15, 15', 25, 35, 45, 55, 65, 75, and 85, which may be capable of providing communications using any suitable wired or wireless communications protocol. For example, one or more of paths 15, 15', 25, 35, 45, 55, 65, 75, and 85 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include a secure element that may be configured to provide a tamper-resistant platform (e.g., as a single or multiple chip secure microcontroller) that may be capable of securely hosting applications and their confidential and cryptographic data (e.g., credential applets and associated credential keys, such as an access key 155*a* and a credential key 155*a*', and/or an issuer security domain ("ISD") key 156*k*, as shown in FIG. 1A) in accordance with rules and security requirements that may be set forth by a set of well-identified trusted authorities (e.g., an authority of financial institution subsystem 350 and/or an industry standard, such as GlobalPlatform). As described below in more detail, a credential applet of NFC component 120 may be configured to provide sufficient detail for identifying a funding account or other financial instrument or credit source, where such a credential applet may be used by electronic device 100 in one or more communications with merchant subsystem 200 and/or commercial entity subsystem 400 for facilitating a financial transaction. NFC component 120 may be configured to communicate such credential information as a contactless proximity-based communication (e.g., near field communication) with merchant subsystem 200 (e.g., with a merchant terminal of merchant subsystem 200, where the merchant terminal may be located at a brick and mortar store or any physical location at which a user of electronic device 100 may use a credential stored on electronic device 100 to conduct a financial transaction with a proximately located merchant terminal via a contactless proximity-based communication). Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 15, 65, and/or 75). Processor 102 of electronic device 100 may include any processing circuitry that may be operative to control the operations and performance of one or more components of electronic device 100. For example, processor 102 may be configured to run one or more applications on device 100 (e.g., online resource or merchant application 113) that may at least partially dictate the way in which payment device identifier-based communications 660 may be communicated between device 100/100' and a merchant server 210 of merchant subsystem 200 (e.g., to conduct a financial transaction with a remote merchant server of merchant subsystem 200 over the internet or any other suitable network or otherwise that may be provided by communications path 15). Moreover, as shown in FIG. 1A, electronic device 100 may include device identification information 119, which may be accessible to processor 102 or any other suitable portion of device 100. As described below, device identification information 119 may be utilized by a user of device 100/100' and/or commercial entity subsystem 400 for providing identification of device 100 to merchant subsystem 200 (e.g., for facilitating a financial transaction). As just one example, device identification information 119 may be a telephone number associated with device 100.

Merchant server 210 of merchant subsystem 200 of FIG. 2 may include any suitable component or subsystem configured to receive payment device identifier-based communications 660 from electronic device 100 or a user thereof via a communication path 15 between device 100 and server 210 and/or payment device identifier-based communications 660 from electronic device 100' or a user thereof via a communications path 15' between device 100' and server 210 (it is to be appreciated that device 100' may include some if not all of the same components of device 100, while only reference to specific components of device 100 may be shown and referenced herein). Such payment device identifier-based communications 660 may be configured to communicate payment device identifier data for a payment device 100 (e.g., for initiating an online payment therewith) to server 210 via any suitable communications protocol supported by communications component 106 of device 100/100' (e.g., Wi-Fi, Bluetooth™, cellular, wired network protocols, etc.). Payment device identifier-based communications 660 may be provided within any suitable online-context, such as when a user of device 100/100' is communicating with merchant server 210 to conduct a financial transaction via a third party application 113 running on device 100/100' that may be managed by merchant server 210 or via an internet application or web browser (e.g., Safari™ by Apple Inc.) running on device 100/100' that may be pointed to a uniform resource locator ("URL") whose target or web resource may be managed by merchant server 210 or via a telephone conversation or text message or other suitable form of communication between device 100/100' and merchant server 210 (e.g., a call center of the merchant or an in-person dialog with a custodian of the merchant). Accordingly, it is noted that payment device identifier-based communications 660 between merchant server 210 and electronic device 100/100' may occur wirelessly and/or via wired paths (e.g., over the internet) or physically/audibly/visually or the like. Merchant server 210 may be provided by a merchant of merchant subsystem 200 (e.g., as a webserver to host website data and/or manage third party application data). Although not shown, merchant subsystem 200 may also include a merchant processor component that may be the same as or similar to a processor component 102 of electronic device 100 of FIGS. 1A and 2, a merchant communications component that may be the same as or similar to a communications component 106 of electronic device 100 of FIGS. 1A and 2, a merchant I/O interface that may be the same as or similar to an I/O interface 114 of electronic device 100 of FIG. 2, a merchant bus that may be the same as or similar to a bus 118 of electronic device 100 of FIG. 2, a merchant memory component that may be the same as or similar to a memory component 104 of electronic device 100 of FIG. 2, and/or a merchant power supply component that may be the same as or similar to a power supply component 108 of electronic device 100 of FIG. 2. Similarly, although not shown, electronic device 100' may also include a processor component that may be the same as or similar to processor component 102 of electronic device 100 of FIGS. 1A and 2, a communications component that may be the same as or similar to communications component 106 of electronic device 100 of FIGS. 1A and 2, an I/O interface that may be the same as or similar to I/O interface 114 of electronic device 100 of FIG. 2, a bus that may be the same as or similar to bus 118 of electronic device 100 of FIG. 2, a memory component that may be the same as or similar to memory component 104 of electronic device 100 of FIG. 2, and/or a power supply component that may be the same as or similar to power supply component 108 of electronic device 100 of FIG. 2.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 may be associated with a specific payment card that may be electronically linked to an account or accounts of a particular user. Various types of payment cards may be suitable, including credit cards, debit cards, charge cards, stored-value cards, fleet cards, gift cards, and the like. The commerce credential of a specific payment card may be provisioned on electronic device 100 (e.g., as a credential of a credential supplemental security domain of NFC component 120, as described below) by issuing bank subsystem 370 for use in a commerce credential data communication (e.g., a contactless proximity-based communication and/or an online-based communication) with merchant subsystem 200 (e.g., via commercial entity subsystem 400 as communication 668/672). Each credential may be a specific brand of payment card that may be branded by a payment network subsystem 360. Payment network subsystem 360 may be a network of various issuing banks 370 and/or various acquiring banks 300 that may process the use of payment cards (e.g., commerce credentials) of a specific brand.

In order for a financial transaction to occur within system 1, at least one commerce credential must be securely provisioned on a secure element of NFC component 120 of electronic device 100. For example, such a commerce credential may be at least partially provisioned on a secure element of NFC component 120 of electronic device 100 directly from financial institution subsystem 350 (e.g., as credential data 654 via a communications path 75 between financial institution subsystem 350 and device 100, which may be passed to NFC component 120 via communications component 106). Additionally or alternatively, such a commerce credential may be at least partially provisioned on a secure element of NFC component 120 of electronic device 100 from financial institution subsystem 350 via commercial entity subsystem 400 (e.g., as credential data 654 via a communications path 55 between financial institution subsystem 350 and commercial entity subsystem 400, which may be passed to device 100 as credential data 654 via a communications path 65 between a server 410 of commercial entity subsystem 400 and communications component 106 of device 100, which may then be passed to NFC component 120 from communications component 106). Credential data 654 via path 75 and/or via paths 55/65 may be provisioned on a secure element of device 100 as at least a portion or all of a credential supplemental security domain of NFC component 120 and may include a credential applet and/or a credential key, such as credential key 155a'. As shown in FIG. 1A, for example, financial institution subsystem 350 may also have access to credential key 155a' (e.g., for decrypting data encrypted by device 100 using credential key 155a'). Financial institution subsystem 350 may be responsible for management of credential key 155a', which may include the generation, exchange, storage, use, and replacement of such a key. Financial institution subsystem 350 may store its version of credential key 155a' in a secure element of financial institution subsystem 350.

Commercial entity subsystem 400 may be provided as an intermediary between electronic device 100 and financial institution subsystem 350, where commercial entity subsystem 400 may be configured to provide a new layer of security and/or to provide a more seamless user experience when a credential is being provisioned on a secure element of device 100 and/or when such a provisioned credential is being used as part of a commerce credential data communication (e.g., as part of an online-based communication 668/672) between device 100 and merchant subsystem 200. Commercial entity subsystem 400 may be provided by a specific commercial entity that may offer various services to a user of device 100 via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, or the like) and/or of an operating system (e.g., device application 103) of device 100. The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and/or independent from any payment network subsystem 360 or issuing bank subsystem 370 that may furnish and/or manage any credit card or any other commerce credential to be provisioned on user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and/or independent from any merchant of merchant subsystem 200 that may provide a merchant terminal for NFC communications, a third party application 113, and/or any other aspect of merchant subsystem 200. Such a commercial entity may leverage its potential ability to configure or control various components of device 100 (e.g., software and/or hardware components of device 100, such as when that commercial entity may at least partially produce or manage device 100) in order to provide a more seamless user experience for a user of device 100 when he or she wants to provision a credential offered by financial institution subsystem 350 on user device 100 and/or when such a provisioned credential is being used as part of a commerce credential data communication with merchant subsystem 200 (e.g., as part of an online-based communication 668/672). For example, in some embodiments, device 100 may be configured to communicate with commercial entity subsystem 400 seamlessly and transparently to a user of device 100 (e.g., via communications path 65) for sharing and/or receiving certain data that may enable a higher level of security (e.g., during an online-based commerce credential data communication between device 100 and merchant subsystem 200). Although not shown, commercial entity subsystem 400 may also include a processor component that may be the same as or similar to processor component 102 of electronic device 100 of FIGS. 1A and 2, a communications component that may be the same as or similar to communications component 106 of electronic device 100 of FIGS. 1A and 2, an I/O interface that may be the same as or similar to I/O interface 114 of electronic device 100 of FIG. 2, a bus that may be the same as or similar to bus 118 of electronic device 100 of FIG. 2, a memory component that may be the same as or similar to memory component 104 of electronic device 100 of FIG. 2, and/or a power supply component that may be the same as or similar to power supply component 108 of electronic device 100 of FIG. 2, one, some or all of which may be at least partially provided by server 410.

In addition to at least one commerce credential being provisioned on a secure element of NFC component 120 of electronic device 100 (e.g., as a portion of a credential SSD with credential key 1554 at least one access SSD with an access key 155b may also be provisioned on the secure element of NFC component 120 of device 100 in order to more securely enable device 100 to conduct a financial transaction with merchant subsystem 200. For example, an access SSD may be at least partially provisioned on a secure element of NFC component 120 of electronic device 100 directly from commercial entity subsystem 400 (e.g., as access data 652 via communications path 65 between server 410 of commercial entity subsystem 400 and communications component 106 of device 100, which may then be passed to NFC component 120 from communications component 106). Access data 652 via path 65 may be provisioned on a secure element of device 100 as at least a portion or all of an access SSD and may include an access applet and/or access key 155b. As shown in FIG. 1A, commercial entity subsystem 400 may also have access to access key 155b (e.g., for decrypting data encrypted by device 100 using access key 155b). Commercial entity subsystem 400 may be responsible for management of access key 155b, which may include the generation, exchange, storage, use, and replacement of such a key. Commercial entity subsystem 400 may store its version of access key 155b in a secure element of commercial entity subsystem 400. An access SSD of NFC component 120 with access key 155b may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a credential of a credential SSD of NFC component 120). By storing such an access SSD within a secure element of device 100, its ability to reliably determine user intent for and authentication of a financial transaction may be increased. Moreover, as described in more detail below, access key 155b of such an access SSD of NFC component 120 may be leveraged to provide increased encryption to financial transaction data that may be communicated outside of the secure element of device 100. Additionally or alternatively, as described below, access data 652 may include an issuer security domain ("ISD") key 156k for an ISD of the secure element of electronic device 100, which may also be maintained by commercial entity subsystem 400, and may be used in addition to or as an alternative to access key 155b, as described below.

As mentioned, in addition to at least one credential SSD and at least one access SSD being provisioned on a secure element of electronic device 100, at least one third party application (e.g., application 113) may be accessed by device 100 in order to enable a commerce credential data communication (e.g., an online-based communication 668/672) between device 100 and merchant subsystem 200. First, such an application 113 may be approved or otherwise enabled by commercial entity subsystem 400 before application 113 may be accessible by device 100. For example, an application store 420 of commercial entity subsystem 400 (e.g., the Apple App Store™) may receive at least some date representative of application 113 from merchant subsystem 200 via communications path 85. Moreover, in some embodiments, commercial entity subsystem 400 may generate or otherwise assign a merchant key 157 for application 113 and provide such a merchant key 157 to merchant subsystem 200 (e.g., via path 85). Alternatively, merchant subsystem 200 may generate or otherwise assign a merchant key 157 for application 113 and provide such a merchant key 157 to commercial entity subsystem 400 (e.g., via path 85). Either merchant subsystem 200 or commercial entity subsystem 400 may be responsible for management of merchant key 157, which may include the generation, exchange, storage, use, and replacement of such a key. No matter how or where such a merchant key 157 may be generated and/or managed, both merchant subsystem 200 and commercial entity subsystem 400 may store a version of merchant key 157 (e.g., in a respective secure element of merchant subsystem 200 and commercial entity subsystem 400). In some embodiments, such a merchant key 157 may be specifically associated with merchant application 113, while, in other embodiments, merchant key 157 may be specifically associated with a merchant of merchant subsystem 200 such that merchant key 157 may be associated with multiple third party applications operated by the same merchant of merchant subsystem 200. A table 430 or any other suitable data structure or source of information that may be accessible to commercial entity subsystem 400 may be provided for associating a particular merchant key 157 with a particular merchant application 113 or merchant entity. Table 430 may enable commercial entity subsystem 400 to determine and utilize an appropriate merchant key 157 for providing a layer of security to a commerce credential data communication (e.g., an online-based communication 668/672) between device 100 and merchant subsystem 200, as described in more detail below. Device 100/100' may be configured to access application 113 (e.g., from application store 420 via communications path 65) and run application 113 (e.g., with processor 102). Alternatively or additionally, a merchant key 157 may be associated with a merchant's website (e.g., one or more URLs) or with the merchant generally, rather than or in addition to a merchant's third party application (e.g., application 113). For example, a merchant of merchant subsystem 200 may work with commercial entity subsystem 400 to associate a particular merchant website or the merchant generally with a particular merchant key 157 within table 430, which may enable commercial entity subsystem 400 to determine and utilize an appropriate merchant key 157 for providing a layer of security to a commerce credential data communication (e.g., an online-based communication 668/672) between device 100 and merchant subsystem 200 (e.g., when a user of device 100/100' is communicating with merchant server 210 to conduct a financial transaction via an interne application or web browser running on device 100/100' that may be pointed to a URL whose target or web resource may be associated with that merchant key 157). Device 100/100' may be configured to access such a URL, for example, from merchant server 210 via communication path 15/15' using an internet application on device 100/100'. In other embodiments, an application 113 may not be associated with a specific merchant, merchant subsystem 200, and/or merchant key 157, but instead may be an independent application available to device 100/100' (e.g., an internet application, a telephone application, etc.).

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application (e.g., an application associated with a merchant of merchant subsystem 200). Moreover, as shown, processor 102 may have access to device identification information 119, which may be utilized by a user of device 100 and/or commercial entity subsystem 400 for providing identification of device 100 to merchant subsystem 200 (e.g., for facilitating a financial transaction).

NFC component 120 may be any suitable proximity-based communication mechanism that may enable contactless proximity-based transactions or communications between electronic device 100 and a merchant terminal (e.g., a merchant payment terminal) of merchant subsystem 200. NFC component 120 may include any suitable modules for enabling contactless proximity-based communication between electronic device 100 and such a merchant terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a merchant terminal as part of a contactless proximity-based or NFC communication. Additionally or alternatively, NFC data module 132 may be configured to contain, route, or otherwise receive any suitable data that may be received by NFC component 120 from a merchant terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a merchant terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and merchant subsystem 200. NFC memory module 150 may be tamper resistant and may provide at least a portion of a secure element 145 (see, e.g., FIG. 3). For example, such a secure element may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A credential may include credential data that may be assigned to a user/consumer and that may be stored securely on electronic device 100, such as a credit card payment number and associated data. NFC memory module 150 may include at least two SSDs 154 (e.g., at least a first SSD 154a and a second SSD 154b). For example, first SSD 154a (e.g., a credential SSD 154a) may be associated with a specific credential (e.g., a specific credit card credential or a specific public transit card credential provisioned by financial institution subsystem 350) that may provide specific privileges or payment rights to electronic device 100, while second SSD 154b (e.g., an access SSD 154b) may be associated with a commercial entity (e.g., a commercial entity of commercial entity subsystem 400, which may be a controlling entity for device 100) that may control access of device 100 to a specific credential of another SSD (e.g., first SSD 154*a*), for example, to provide specific privileges or payment rights to electronic device 100. Alternatively, each one of first SSD 154*a* and second SSD 154*b* may be associated with a respective specific credential (e.g., a specific credit card credential or a specific public transit card credential provisioned by financial institution subsystem 350) that may provide specific privileges or payment rights to electronic device 100. Each SSD 154 may include and/or be associated with at least one applet 153 (e.g., SSD 154*a* with applet 153*a* and SSD 154*b* with applet 153*b*). For example, an applet 153 of an SSD 154 may be an application that may run on a secure element of NFC component 120 (e.g., in a Global-Platform environment). Each applet 153 may also include and/or be associated with at least one of its own keys 155 (e.g., applet 153*a* with at least one key 155*a* and applet 153*b* with at least one key 155*b*).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. Each key and applet may be loaded on the secure element of device 100 by a TSM or an authorized agent or pre-loaded on the secure element when first provided on device 100. As one example, while credential SSD 154*a* may be associated with a particular credit card credential, that particular credential may only be communicated as a commerce credential data communication to merchant subsystem 200 (e.g., as a contactless proximity-based communication to a merchant terminal and/or as an online-based communication 668/672 to a merchant server 210 (e.g., via commercial entity subsystem 400)) from a secure element of device 100 (e.g., from NFC component 120) for a financial transaction when applet 153*a* of that credential SSD 154*a* has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200 (e.g., via commercial entity subsystem 400). Such security features also may include a secure storage area that may have restricted access. For example, user authentication via personal identification number ("PIN") entry or via user interaction with a biometric sensor may need to be provided to access the secure storage area. As an example, an access SSD 154*b* may leverage applet 153*b* to determine whether such authentication has occurred before allowing other SSDs 154 (e.g., a credential SSD 154*a*) to be used for communicating its credential information. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, applet 153*b* of an access SSD 154*b* may be configured to determine intent and local authentication of a user of device 100 (e.g., via one or more input components 110, such as a biometric input component) and, in response to such a determination, may be configured to enable another particular SSD for conducting a payment transaction (e.g., with a credential of a credential SSD 154*a*).

Description of FIG. 3

Referring now to FIG. 3, FIG. 3 shows another detailed view of a portion of electronic device 100 of system 1 described above with respect to FIGS. 1-2. As shown in FIG. 3, for example, a secure element 145 of NFC component 120 may include SSD 154*a*, which may include or be associated with applet 153*a*, which may include an access key 155*a* and/or a credential key 155*a*', and SSD 154*b*, which may include or be associated with applet 153*b*, which may include an access key 155*b* and/or a credential key 155*b*'. In some embodiments, a specific supplemental security domain ("SSD") 154 (e.g., one of SSDs 154*a* and 154*b*) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155*ak* and 155*bk*) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153*a* of SSD 154*a* may be associated with a first commerce credential and/or credential applet 153*b* of SSD 154*b* may be associated with a second commerce credential), where a credential applet may have its own access key (e.g., access key 155*a* for credential applet 153*a* and/or access key 155*b* for credential applet 153*b*) and/or its own credential key (e.g., credential key 155*a*' for credential applet 153*a* and/or credential key 155*b*' for credential applet 153*b*), and where a credential applet may need to be activated to enable its associated commerce credential for use by NFC device module 130 as an NFC communication and/or as an online-based communication 668/672 between electronic device 100 and merchant subsystem 200. In some embodiments, a credential key of a credential applet (e.g., credential key 155*a*' for credential applet 153*a* and/or credential key 155*b*' for credential applet 153*b*) may be generated by financial institution subsystem 350 that may be responsible for such a credential and may be accessible by that financial institution subsystem 350 (e.g., as shown in FIG. 1A) for enabling secure transmission of that credential applet between secure element 145 and financial institution subsystem 350. Additionally or alternatively, an access key of a credential applet (e.g., access key 155*a* for credential applet 153*a* and/or access key 155*b* for credential applet 153*b*) may be generated by commercial entity subsystem 400 and may be accessible by commercial entity subsystem 400 (e.g., as shown in FIG. 1A) for enabling secure transmission of that credential applet between secure element 145 and commercial entity subsystem 400.

Additionally or alternatively, as shown in FIG. 3, secure element 145 may include ISD 152, which may include an ISD key 156*k* that may also be known to a trusted service manager associated with that security domain (e.g., commercial entity subsystem 400, as shown in FIG. 1A). ISD key 156*k* may be leveraged by commercial entity subsystem 400 and electronic device 100 similarly to and/or instead of access key 155*a* and/or access key 155*b* for enabling secure transmissions between commercial entity subsystem 400 and secure element 145 of electronic device 100. Moreover, as shown in FIG. 3, and as described below in more detail, various data may be communicated between processor 102 and secure element 145. For example, processor 102 of device 100 may be configured to run a device application 103 that may communicate information with a merchant application 113 of processor 102 as well as secure element 145, an I/O interface component 114a (e.g., for receiving I/O input data 115i and/or for transmitting I/O output data 115o), and/or communications component 106. Moreover, as shown, processor 102 may have access to device identification information 119, which may be utilized for providing identification of device 100 to merchant subsystem 200 (e.g., for facilitating a financial transaction), as described below.

Additionally or alternatively, as shown in FIG. 3, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it may not be inspected or modified by any entity, including an issuer of secure element 145. CASD 158 may be configured to include and/or may be configured to generate and/or otherwise include CASD access kit 158k (e.g., a CASD private key ("CASD-SK"), a CASD public key ("CASD-PK"), a CASD certificate ("CASD-Cert."), and/or a CASD-signing module). For example, CASD 158 may be configured to sign certain data on secure element 145 (e.g., using CASD access kit 158k) before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using an associated CASD kit 158k at commercial entity subsystem 400).

Additionally or alternatively, as shown in FIG. 3, secure element 145 may include a contactless registry services ("CRS") applet or application 151 that may be configured to provide local functionality to electronic device 100 for modifying a life cycle state (e.g., activated, deactivated, locked, etc.) of certain security domain elements and sharing certain output information 115o about certain security domain elements in certain life cycle states with a user of device 100 (e.g., via a user I/O interface 114a). Additionally or alternatively, CRS 151 may include a CRS access key 151k that may also be known to a trusted service manager associated with CRS 151 (e.g., commercial entity subsystem 400, as shown in FIG. 1A). CRS access key 151k may be leveraged by commercial entity subsystem 400 and electronic device 100 similarly to and/or instead of access key 155a and/or access key 155b for enabling secure transmissions between commercial entity subsystem 400 and secure element 145 of electronic device 100.

Description of FIG. 4

As shown in FIG. 4, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific third party merchant application and may display screens of a specific user interface that may include one or more tools or features for interacting with device 100 in a specific manner (see, e.g., FIGS. 9A-9H for specific examples of such displays of GUI 180 during use of a merchant application (e.g., application 113) that may be used by a user of device 100 for making an online payment with a credential of NFC component 120 (e.g., a credential of credential SSD 154a)). For each application, screens may be displayed on display output component 112a and may include various user interface elements. Additionally or alternatively, for each application, various other types of non-visual information may be provided to a user via various other output components 112 of device 100.

Description of FIG. 5, FIG. 6, and FIGS. 9A-9H

To facilitate the following discussion regarding the operation of system 1 for securely conducting online payments between device 100 and merchant subsystem 200 (e.g., when a credential of a secure element of device 100 is being used as part of an online-based communication 668/672 between device 100 and merchant subsystem 200), reference is made to one or more processes of one or more flowcharts of FIGS. 5 and 6, to various components of system 1 of the schematic diagrams of FIGS. 1-4, and to front views of screens 190-190h that may be representative of a graphical user interface of electronic device 100 and/or device 100' during such a payment (e.g., as shown in FIGS. 4 and 9A-9H). The operation described may be achieved with a wide variety of graphical elements and visual schemes. Therefore, the embodiments of FIGS. 4 and 9A-9H are not intended to be limited to the precise user interface conventions adopted herein. Rather, embodiments may include a wide variety of user interface styles.

FIG. 5 is a flowchart of an illustrative process 500 for securely conducting online payments. Process 500 is shown being implemented by electronic device 100, merchant subsystem 200, acquiring bank subsystem 300, commercial entity subsystem 400, and financial institution subsystem 350. However, it is to be understood that process 500 may be implemented using any other suitable components or subsystems. Process 500 may provide a seamless user experience for securely conducting online payments with merchant subsystem 200 on device 100. Process 500 may begin at step 502, where electronic device 100 may communicate payment device identification data with merchant subsystem 200. For example, a user of device 100 may be interfacing with merchant subsystem 200 via an online resource 113 running on device 100, and the user may communicate payment device identification data associated with a payment device with which the user would like to pay for a product or service of the merchant, for example, by entering and communicating that payment device identification data (e.g., device identification information 119 of device 100) to merchant subsystem 200 via the online resource (e.g., via communications path 15). Alternatively, communication of payment device identification data from device 100 to merchant subsystem 200 may be automatically carried out by device 100 in response to a particular request made by merchant subsystem 200 of device 100 for device identification information 119 of device 100 (e.g., in a default or customized setting of an online resource 113 of device 100, where device identification information 119 is to be used as initial/default payment information to be provided to merchant subsystem 200). Online resource 113 may be a third party application managed by merchant subsystem 200, an internet browser pointed at a site managed by a merchant of merchant subsystem 200, a telephone/e-mail/text messaging application fostering a communication connection between device 100 and an entity of merchant subsystem 200, and/or any other suitable device capability for fostering any suitable online communication connection between device 100 and an entity of merchant subsystem 200. Communication of payment device identification data at step 502 from device 100 to merchant subsystem 200 may be in response to a particular transaction being arranged between a user of device 100 and merchant subsystem 200. For example, step 502 may occur in response to a user interacting with an online resource to select a particular product for purchase at a particular price from a particular merchant and in response to the online resource requesting payment information from the user in order to finance the arranged purchase. In some embodiments, such payment device identification data of step 502 may not only include identification of a particular payment device, but also any suitable additional information that may be provided by device 100 for identifying one or more particular characteristics of the purchase transaction to be financed.

Next, at step 504, in response to receiving such payment device identification data at step 502, merchant subsystem 200 may communicate transaction request data to commercial entity subsystem 400. Such transaction request data may include information representative of the payment device identification data received at step 502 as well as any suitable additional information that may be provided by merchant subsystem 200 for identifying one or more particular characteristics of the purchase transaction to be financed. For example, in addition to identifying the payment device identification data received at step 502, the transaction request data communicated from merchant subsystem 200 to commercial entity subsystem 400 (e.g., via path 85) may include a merchant identifier that may identify the particular merchant sending the data, a transaction identifier that may identify the particular purchase transaction to be financed, one or more pieces of information specific to that transaction (e.g., purchase price, description of product/service being purchased, shipping information, etc.), identification of the currency to be used during the transaction, a list of financial institutions whose payment credentials may be accepted by merchant subsystem 200, and/or one or more fields of customizable information that may be uniquely customized by merchant subsystem 200 for a particular transaction (e.g., additional information that may be requested of the purchaser, such as a request for selection of one of several options for a complimentary gift from the merchant to the purchaser, etc.).

Next, at step 506, in response to receiving such transaction request data at step 504, commercial entity subsystem 400 may communicate payment request data to electronic device 100 (e.g., to the payment device associated with the payment device identification data provided to merchant subsystem 200 at step 502 and then to commercial entity subsystem 400 at step 504). Such payment request data may include any suitable information that may be provided by commercial entity subsystem 400 for identifying one or more particular characteristics of the purchase transaction to be financed. For example, in response to identifying the particular payment device 100 that is to receive such payment request data (e.g., by analyzing the payment device identification data received from merchant subsystem 200 at step 504), commercial entity subsystem 400 may generate and transmit such payment request data to that device 100 at step 506 (e.g., via path 65), where such payment request data may include any suitable information included in or based on the transaction request data of step 504 that may identify one or more particulars of the transaction to that device 100. For example, like the transaction request data of step 504, the payment request data of step 506 may include a merchant identifier that may identify the particular merchant that instigated step 506 (e.g., the merchant that sent transaction request data at step 504), a transaction identifier that may identify the particular purchase transaction to be financed, one or more pieces of information specific to that transaction (e.g., purchase price, description of product/service being purchased, shipping information, etc.), and/or one or more fields of customizable information that may be uniquely customized by merchant subsystem 200 for a particular transaction. In some embodiments, such payment request data may be encrypted or otherwise formatted by commercial entity subsystem 400 before communication to the target payment device 100 using one or more suitable commercial entity keys (e.g., ISD key 156$k$ and/or any other suitable access key, such as one or more of keys 151$k$, 155$a$, 155$b$, 158$k$) that may be available to commercial entity subsystem 400 and that may be associated with the payment device 100 that is to receive such payment request data (e.g., for creating a secure communication channel between commercial entity subsystem 400 and the payment device 100, such that payment device 100 may utilize an associated device key for decrypting or otherwise reformatting the payment request data before use by device 100 so as to ensure that the source of the payment request data is trustworthy). It is to be understood, as described below in more detail, that, in some embodiments, the payment device identification data provided by electronic device 100 at step 502 to merchant subsystem 200 may not necessarily be payment device identification data that identifies that same electronic device 100, but instead may be payment device identification data that may identify another electronic device 100 (e.g., a payment electronic device that is to receive payment request data from commercial entity subsystem 400 at step 506). For example, with reference to system 1 of FIGS. 1 and 1A, electronic device 100' may communicate payment device identification data to merchant subsystem 200 at step 502 for initiating a payment process of a particular purchase (e.g., via an online resource running on electronic device 100'), where such payment device identification data may identify electronic device 100 as a payment device, such that payment request data may be communicated by commercial entity subsystem 400 to that electronic device 100 at step 506 for continuing the payment process of the particular purchase initiated by device 100'.

At step 508, in response to the appropriate payment electronic device 100 receiving payment request data at step 506, a user of that payment device 100 may interact with device 100 for selecting and/or authenticating the use of particular payment credential data available to device 100 (e.g., data of a credential applet of a secure element of device 100) for funding the purchase transaction identified by the payment request data. In certain embodiments, that selected/authenticated payment credential data may be encrypted, signed, or otherwise formatted with a commercial entity key by device 100 at step 508. For example, secure element 145 of device 100 may encrypt payment card credential data from SSD 154a (e.g., applet 153a data) with access key 155a, access key 155b, CRS 151k, and/or ISD key 156k of secure element 145 that may be accessible to commercial entity subsystem 400. Alternatively or additionally, secure element 145 may sign payment card credential data from SSD 154a with CASD 158k that may be accessible to commercial entity subsystem 400. Such encrypting, signing, and/or formatting may enable communication of such data to commercial entity subsystem to be done via a secure communication channel.

Next, at step 510, process 500 may include electronic device 100 communicating the selected, authenticated, and or formatted payment card data of step 508 to commercial entity subsystem 400. For example, such encrypted payment card data may be transmitted from communications component 106 of electronic device 100 to server 410 of commercial entity subsystem 400 via communications path 65 using any suitable communications protocol. In some embodiments, the payment card data of step 510 may include not only the payment card data of step 508 but also any other suitable data indicative of the particular transaction being funded (e.g., any suitable data that may have been included in or based on the payment request data of step 506, such as a merchant identifier that may identify the particular merchant that instigated step 506 (e.g., the merchant that sent transaction request data at step 504), a transaction identifier that may identify the particular purchase transaction to be financed, one or more pieces of information specific to that transaction (e.g., purchase price, description of product/service being purchased, shipping information, etc.), and/or one or more fields of customizable information that may be uniquely customized by merchant subsystem 200 for a particular transaction, where such customizable information may be supplemented by customizable response data provided by payment device 100 (e.g., response data provided by a user of payment device 100 in response to such customized information from merchant subsystem 200)).

Next, at step 512, process 500 may include commercial entity subsystem 400 receiving and decrypting the communicated encrypted payment card data of step 510 with a commercial entity key. For example, server 410 of commercial entity subsystem 400 may receive the encrypted payment card data from electronic device 100, and then decrypt that encrypted payment card data with access key 155a, access key 155b, CRS 151k, and/or ISD key 156k of commercial entity subsystem 400 and/or unsign the payment card data with CASD 158k of commercial entity subsystem 400. By communicating the payment card data between electronic device 100 and commercial entity subsystem 400 in a form that has been encrypted/signed using a commercial entity key known to both electronic device 100 and commercial entity subsystem 400 (e.g., CASD 158k, access key 155a, access key 155b, CRS 151k, and/or ISD key 156k), process 500 may prohibit the communication of such encrypted payment card data from being intercepted and decrypted by an entity that does not have access to the commercial entity key. Moreover, at step 512, commercial entity subsystem 400 may then re-encrypt or otherwise re-format that decrypted payment card data with a merchant key (e.g., merchant key 157 that may be associated with merchant subsystem 200 for which the particular transaction is being funded). Such a merchant key may be determined by and accessible to commercial entity subsystem 400 via table 430 (e.g., by identifying a merchant key associated with a merchant identifier of the transaction request data of step 504, of the payment request data of step 506, and/or of the payment card data of step 510). For example, as mentioned, in some embodiments, the transaction request data communicated from merchant subsystem 200 to commercial entity subsystem 400 at step 504 may include a merchant identifier that may be indicative of merchant subsystem 200. Such a merchant identifier may be utilized by commercial entity subsystem 400 at step 512 to identify a particular one of many merchant keys accessible by commercial entity subsystem 400 to use for encrypting payment card data of step 508/510 (e.g., merchant key 157 through leveraging table 430 of commercial entity subsystem 400). By encrypting such payment card data with such a merchant key (e.g., a key that may only be known to commercial entity subsystem 400 and merchant subsystem 200), such payment card data may be securely communicated from commercial entity subsystem 400 to merchant subsystem 200 without being intercepted by another entity.

Next, at step 514, process 500 may include commercial entity subsystem 400 communicating the re-encrypted payment card data of step 512 to merchant subsystem 200. For example, such re-encrypted payment card data may be transmitted from commercial entity subsystem 400 to merchant subsystem 200 via communications path 85 using any suitable communications protocol. By communicating the payment card data from commercial entity subsystem 400 to merchant subsystem 200 in a re-encrypted form that has been re-encrypted using a merchant key known to both commercial entity subsystem 400 and merchant subsystem 200 (e.g., merchant key 157), process 500 may prohibit the communication of such re-encrypted payment card data from being decrypted and altered by an entity that does not have access to the merchant key (e.g., electronic device 100). In some embodiments, the data communicated from electronic device 100 to commercial entity subsystem 400 at step 510 may include a merchant identifier that may be indicative of a merchant subsystem with which electronic device 100 is attempting to conduct a financial transaction (e.g., the same merchant identifier that may have been included in the transaction request data of step 504 and/or the payment request data of step 506). Such a merchant identifier may be received and utilized by commercial entity subsystem 400 at step 512 to identify a particular one of many merchant keys accessible by commercial entity subsystem 400 to use for the re-encryption of the payment card data at step 512 (e.g., merchant key 157 through leveraging table 430 of commercial entity subsystem 400).

After the re-encrypted payment card data communicated from commercial entity subsystem 400 at step 514 has been received by merchant subsystem 200, process 500 may include merchant subsystem 200 utilizing that re-encrypted payment card data to execute a financial transaction with acquiring bank 300 and/or financial institution subsystem 350 at step 516. For example, merchant subsystem 200 may decrypt the re-encrypted payment card data with a merchant key accessible to merchant subsystem 200 (e.g., merchant key 157) and may then forward that payment card data to acquiring bank 300 and/or financial institution subsystem 350 (e.g., via communications path 25 and/or communications path 35) such that a funding account associated with that payment card data may be identified and used by acquiring bank 300 and/or financial institution subsystem 350 to fund a financial transaction. Next, after such a transaction has been executed at step 516, process 500 may include merchant subsystem 200 confirming the status of the transaction (e.g., the execution or denial of the transaction) to electronic device 100 using any suitable confirmation information at step 518 (e.g., directly via communications path 15 and/or indirectly via commercial entity subsystem 400 and paths 85 and 65). In some embodiments, at step 510, payment device 100 may communicate, along with the encrypted payment card data of step 508, at least one communication mechanism identifier associated with that device 100 (e.g., e-mail address, telephone number, etc.), which may be used by device 100 to receive such confirmation information at step 518. Such a communication mechanism identifier of the data communicated at step 510 from payment device 100 to commercial entity subsystem 400 may be included in the data communicated from commercial entity subsystem 400 to merchant subsystem 200 at step 514, such that merchant subsystem 200 may utilize that communication mechanism identifier to determine in what manner to communicate the transaction status information of step 518 to payment device 100.

In some embodiments, the payment card data encrypted by electronic device 100 at step 508 may first be encrypted by a credential key (e.g., credential key 155$a'$ of secure element 145). Such a credential key may not be accessible by commercial entity subsystem 400, such that the payment card data of not only the decrypted payment card data of step 512 but also the re-encrypted payment card data of steps 512/514 may remain encrypted by that credential key. Acquiring bank 300 and/or financial institution subsystem 350 may have access to such a credential key (e.g., credential key 155$a'$ of financial institution subsystem 350 of FIG. 1A), such that when the payment card data is forwarded to acquiring bank 300 and/or financial institution subsystem 350 by merchant subsystem 200 at step 516, acquiring bank 300 and/or financial institution subsystem 350 may decrypt the payment card data using the credential key before being able to identify the funding account associated with that payment card data.

Therefore, process 500 may utilize a commercial entity subsystem to add at least one layer of security to an online financial transaction between a merchant and a user of at least one electronic device (e.g., device 100 or device 100' and device 100). The commercial entity may be privy not only to a commercial entity key available at a secure element of the payment device but also to a merchant key available to the merchant Therefore, the commercial entity may be in a unique position to manage any online transactions between the secure element of the payment device and the merchant, while at the same time not being privy to the payment card data being used to identify an account for finding that transaction (e.g., as the commercial entity may not have access to a credential key with which the credential data may be initially encrypted by the secure element). Moreover, process 500 may enable a user to provide any suitable payment device identification data for a particular payment device to a merchant subsystem (e.g., a simple telephone number associated with a portable telephone enabled as a payment device, rather than a hard to remember credit card number) using any suitable communication protocol that may be secure or relatively unsecure (e.g., at step 502 from the payment device or from any other suitable electronic device), while still maintaining the security of payment card data of a secure element of the payment device, which may be securely communicated to the merchant subsystem via a commercial entity subsystem. Process 500 also enables a user to interact with a merchant subsystem via an online resource electronic device (e.g., device 100' of system 1) for defining a transaction to be funded (e.g., using an online resource running on that first electronic device) without that first online resource electronic device having to be a payment electronic device (e.g., device 100 of system 1 with a secure element 145 and one or more payment credentials). For example, first online resource electronic device electronic device 100' (e.g., a "user" electronic device 100') may communicate payment device identification data to merchant subsystem 200 at step 502 via a telephone call with a call center of the merchant or via a desktop computer interface with a website of the merchant. Alternatively, a user may simply speak the payment device identification information out loud to a merchant (e.g., where an online resource or user electronic device 100/100' is not even necessary). This may allow a user to interact with a merchant without relying on the communication or interface capabilities of a payment device 100 (e.g., such that the payment device does not have to be able to run an online resource of the merchant subsystem).

Moreover, in some embodiments, payment device 100 may not include a secure element with any payment credentials for use in funding a purchase. Instead, commercial entity subsystem 400 may have one or more payment credentials of a user associated with payment device 100 "on file" at commercial entity subsystem 400 (e.g., at server 410, where commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may have user accounts for these services with associated credit cards for use in paying for these services). Therefore, rather than payment request data of step 506 requesting that payment device 100 share payment card data of device 100 with commercial entity subsystem 400 at step 510, such payment request data of step 506 may request that a user of payment device 100 authenticate an account that he or she has with commercial entity subsystem 400 (e.g., enter password data for a user's Apple ID™, such as at step 508/510 (e.g., where that Apple ID™ may have been the device identifier for device 100 provided at step 502)), which may authorize commercial entity subsystem 400 to use a credit card or other payment method that may already be available to commercial entity subsystem 400 for that user's account as payment card data that may be provided by commercial entity subsystem 400 (e.g., on behalf of the user of device 100) to merchant subsystem 200 (e.g., at step 514) for funding a purchase transaction (e.g., rather than receiving specific payment card data from device 100 at step 510).

It is understood that the steps shown in process 500 of FIG. 5 are merely illustrative and that existing steps may be modified or omitted, additional steps may be added, and the order of certain steps may be altered.

FIG. 6 is a flowchart of an illustrative process 600 for securely conducting online payments. Process 600 is shown being implemented by electronic device 100, electronic device 100', merchant subsystem 200, acquiring bank subsystem 300, commercial entity subsystem 400, and financial institution subsystem 350. However, it is to be understood that process 600 may be implemented using any other suitable components or subsystems. Process 600 may provide a seamless user experience for securely conducting online payments with merchant subsystem 200 on device 100 and, in some embodiments, in conjunction with device 100'. It is to be understood that electronic device 100' may be similar to device 100, and device 100' may include at least some or all of the same components as device 100 (e.g., a processor, memory, communications component, power supply, I/O interface, device application, and/or online resource application). However, in some embodiments, device 100' may not include an NFC component and/or a secure element with one or more payment credentials. For example, in some embodiments, device 100 may be a payment device that may include a user's personal cellular telephone or any other suitable device type with a secure element 145 with at least one payment credential provisioned thereon, while device 100' may be a public device, such as a desktop computer in a library that may be shared by multiple users and that may not include any payment credentials provisioned thereon. As mentioned above with respect to FIG. 5, device 100' may be referred to as an online resource device for providing payment device identification data to a merchant, where, in some embodiments, device 100' may not be a device at all but may simply represent a user manually conveying such payment device identification data to a merchant (e.g., orally, via a hand written note, sign language, etc.). Moreover, as mentioned above with respect to FIG. 5, payment device 100 may not necessarily include a payment credential provisioned thereon but instead may include a device in some way associated with a user account at commercial entity subsystem 400, where payment device 100 may be used to authenticate such a user account and authorize commercial entity subsystem 400 to use a payment credential associated with that account to fund a purchase transaction.

Process 600 may begin at step 602, where access data 652 (e.g., access data 652 of FIG. 1A) may be provisioned on a secure element of electronic device 100 by commercial entity subsystem 400. For example, at least one access SSD (e.g., SSD 154*b*) may be provisioned on a secure element (e.g., NFC component 120) of device 100 as access data 652 from server 410 of commercial entity subsystem 400 in order to more securely enable device 100 to conduct a financial transaction with merchant subsystem 200. As mentioned, access SSD 154*b* may be at least partially provisioned on a secure element of NFC component 120 of electronic device 100 directly from commercial entity subsystem 400 (e.g., as access data 652 via communication path 65 between server 410 of commercial entity subsystem 400 and communications component 106 of device 100, which may then be passed to NFC component 120 from communications component 106 (e.g., via bus 118)). Access data 652 via path 65 may be provisioned on secure element 145 of device 100 as at least a portion or all of an access SSD 154*b* and may include access applet 153*b* and/or access key 155*b*. Step 602 may be at least partially carried out when device 100 is initially configured (e.g., by commercial entity subsystem 400 before device 100 is sold to a user). Alternatively, step 602 may be at least partially carried out in response to a user of device 100 initially setting up NFC component 120. Additionally or alternatively, access data 652 may include ISD key 156*k* for ISD 152 of the secure element of electronic device 100 and may be used in addition to or as an alternative to access key 155*b* for enabling secure transmissions between commercial entity subsystem 400 and electronic device 100. Additionally or alternatively, access data 652 may include CRS 151*k* of CRS 151 and/or CASD 158*k* of CASD 158 of secure element 145 of electronic device 100 and may be used in addition to or as an alternative to access key 155*b* and/or access key 155*a* and/or ISD key 156*k* for enabling secure transmissions between commercial entity subsystem 400 and electronic device 100.

At step 604, process 600 may include provisioning credential data 654 (e.g., credential data 654 of FIG. 1A) on a secure element of electronic device 100 by financial institution subsystem 350, in some embodiments, via commercial entity subsystem 400. For example, such credential data 654 may be at least partially provisioned on a secure element of NFC component 120 of electronic device 100 directly from financial institution subsystem 350 (e.g., via communications path 75 of FIG. 1A between financial institution subsystem 350 and device 100, which may be passed to NFC component 120 via communications component 106). Additionally or alternatively, such credential data 654 may be at least partially provisioned on a secure element of NFC component 120 of electronic device 100 from financial institution subsystem 350 via commercial entity subsystem 400 (e.g., via communications path 55 of FIG. 1A between financial institution subsystem 350 and commercial entity subsystem 400, which may be passed to device 100 as credential data 654 via communications path 65 of FIG. 1A between server 410 of commercial entity subsystem 400 and communications component 106 of device 100, which may then be passed to NFC component 120 from communications component 106 (e.g., via bus 118)). Credential data 654 via path 75 and/or via path 65 may be provisioned on a secure element of device 100 as at least a portion or all of credential SSD 154*a* and may include credential applet 153*a* and/or credential key 155*a'*. Step 604 may be at least partially carried out when a user of device 100 selects a particular credential to be provisioned on device 100. In some embodiments, credential data 654 may also include access key 155*a*, which may be initially provided from commercial entity subsystem 400 to financial institution subsystem 350 and/or may be added by commercial entity subsystem 400.

The credential data provisioned on device 100 may include all data necessary to make a payment with that credential, such as, for example, a primary account number ("PAN"), a card security code (e.g., a card verification code ("CVV")), expiration date, name associated with the credential, and the like. A "virtual" credential or virtual PAN or device PAN ("D-PAN") may be provisioned on device 100 rather than the user's "actual" credential or actual PAN or funding PAN ("F-PAN"). For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, financial institution subsystem 350 (e.g., a particular payment network subsystem 360 that may be associated with the brand of the actual credential) may define and store a virtual-linking table 312 (e.g., as shown in FIG. 1A) that may create one or more associations between the actual credential and a virtual credential, such that anytime a virtual credential is utilized by device 100 for a financial transaction with merchant subsystem 200 (e.g., after being provisioned on device 100), payment network subsystem 360 may receive an authorization request indicative of that virtual credential (e.g., as data 676 of FIG. 1A) and may conduct an analysis of that authorization request in light of the actual credential associated with the virtual credential as determined by table 312. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 312 for linking the virtual credential to the actual credential during certain types of transactions.

At step 606, process 600 may include associating a merchant's online resource, such as a merchant application 113 or a merchant website or a merchant call center or a merchant generally, with a merchant key 157. For example, commercial entity subsystem 400 may populate a table 430 to associate a merchant key 157 with a merchant identifier or a merchant's resource (e.g., application 113 or website) of a particular merchant subsystem for enabling a secure commerce credential data communication (e.g., an online-based communication 668/672 of FIG. 1A) between device 100 and particular merchant subsystem 200 (e.g., through using that merchant resource). Both merchant subsystem 200 and commercial entity subsystem 400 may store a version of such a merchant key 157 (e.g., in a respective secure element of merchant subsystem 200 and commercial entity subsystem 400, as shown in FIG. 1A). In some embodiments, in order to participate in an online-resource payment program, a merchant may be required to register as a member of a program run by the commercial entity of commercial entity subsystem 400 and/or obtain a merchant certificate. Merchants may not be able to receive payment data without a certificate. Each certificate may contain a unique merchant identifier that may bind the merchant to a key for that merchant (e.g., a merchant key 157). A merchant may obtain multiple certificates, and thus may hold more than one identity. Such a unique merchant identifier may be provided by merchant subsystem 200 to device 100/100' (e.g., at step 608 as a portion of data 658 sent to device 100/100' and/or to commercial entity subsystem 400 (e.g., at step 612 as at least a portion of data 662) that may be passed on as at least a portion of payment request data 664 to device 100 at step 614 and/or as an inherent element of the online resource running on device 100 (e.g., merchant application 113), and such a merchant identifier may be provided from device 100 to commercial entity subsystem 400 during an attempted transaction (e.g., as at least a portion of data 668 at step 618 described below).

At step 608, process 600 may include an online resource (e.g., a merchant's third party application 113), being accessed by device 100 or device 100'. As shown in FIG. 1A, a merchant's third party application 113 may be loaded onto device 100 from commercial entity subsystem 400 (e.g., from application store 420), whereby, as shown in FIG. 4, a user may select "Merchant App" icon 183 of a specific screen 190 of GUI 180 using touch screen input component 110f of I/O component 114a, and this selection may be recognized by electronic device 100 as an initiation event for providing the user with the ability to interact with such a merchant's third party application 113. Device 100' may similarly receive such an application 113. Alternatively or additionally, such an online resource may be accessed by electronic device 100 or device 100' directly from merchant subsystem 200. In response to such a selection of a merchant application icon 183, GUI 180 may provide an interactive screen where electronic device 100 (or device 100') may enable the user to interact with application 113 to peruse commercially available items from the merchant for purchase. Alternatively, step 608 may include device 100 or device 100' accessing a merchant's online resource as a merchant's webpage from merchant subsystem 200 (e.g., via merchant server 210) using an internet application of device 100/100', which may also be selectable by an "Internet" icon 182 of specific screen 190 of GUI 180 of FIG. 4 for providing the user with the ability to interact with a merchant's webpage rather than with a merchant's third part application. Alternatively, step 608 may include device 100 or device 100' communicating via telephone or any other suitable communication mechanism of the device as a merchant's online resource for connection with a merchant's call center operator or the like from merchant subsystem 200 (e.g., via merchant server 210) using a telephone application or any other suitable communication mechanism of device 100/100', which may also be selectable by a "Telephone" icon 184 of specific screen 190 of GUI 180 of FIG. 4 for providing the user with the ability to interact with a merchant's call center rather than with a merchant's third part application or webpage.

Moreover, at step 608, when such an online resource is accessed (e.g., a merchant's application, webpage, call center, etc., such that a user of the device may communicate with a merchant), device 100/100' may receive potential transaction data 658 from the accessed online resource. For example, as shown in FIG. 1A, potential transaction data 658 may be provided to device 100/100' from merchant subsystem 200 (e.g., from merchant server 210 or a merchant call center operator or otherwise) when device 100/100' is interacting with the merchant's third party application 113 or the merchant's website or any other suitable online resource of the merchant. Alternatively or additionally, at least a portion of such potential transaction data may be locally accessible by device 100/100' via application 113 local to device 100/100' (e.g., when application 113 is stored in memory component 104 or being run by processor 102 of device 100/100'), rather than the data being actively sent to device 100/100' from merchant server 210 at step 608. For example, when application 113 is initially stored on device 100/100' (e.g., at step 608 as merchant's online resource 113), at least some potential transaction data may be generated by that initially stored application 113 absent any additional information provided to device 100/100' by merchant subsystem 200. Potential transaction data of step 608 may include any suitable data indicative of one or more characteristics of a potential financial transaction to occur between a user of device 100/100' and a merchant of merchant subsystem 200, including, but not limited to, identification of device 100/100', identification of the merchant, identification of the particular merchant resource being used (e.g., the particular merchant application 113 or website being accessed by device 100/100'), identification of the particular product or service to be purchased or rented or otherwise paid for, identification of the price to be paid, identification of the currency to be used during the transaction, identification of a default or initial shipping address to be used, a list of financial institutions whose credentials may be accepted by merchant subsystem 200, and/or any other suitable information. Such potential transaction data may define an online resource's request to produce a payment token for the purchase of products and/or services and may encapsulate any suitable information about the potential transaction including, for example, information about the merchant's payment processing capabilities, an amount to pay, and the currency code. For example, as shown in FIG. 9A, GUI 180 may provide screen 190a, where an online resource may use potential transaction data 658 of step 608 to show to a user of device 100/100' the name of the merchant (e.g., "Merchant A") with information 907a, the name of the product (e.g., "Product B") with information 907b, the price (e.g., "Price C") with information 907c, and/or initial shipping data (e.g., "Address D") with information 907d. Potential transaction data 658 that may be provided to device 100/100' by merchant server 210 at step 608 may be indicative of such information 907a, 907b, 907c, and/or 907d. As also shown in FIG. 9A and described below in more detail, screen 190a may also include an enter payment method prompt 909. Potential transaction data 658 may be provided from merchant server 210 to device 100/100' via communications path 15/15' of FIG. 1A and may be received by communications component 106 of device 100/100'. Communications component 106 may pass this potential transaction data 658 on to processor 102 (e.g., for displaying on screen 190a as part of a user interface for the online resource application 113 on device 100/100' (e.g., for information 907a-907d and 909)). In some embodiments, potential transaction data 658 may be referred to as payment request data and/or a uniform resource locator ("URL") or any other suitable reference character string and/or query string.

At step 610 (e.g., in response to providing potential transaction data 658, where the online resource may prompt device 100/100' to provide a payment method for funding the potential transaction (e.g., as shown by payment method prompt 909 of FIG. 9A)), payment device identification data 660 may be received by merchant subsystem 200 (e.g., via the online resource). For example, a user of device 100/100' may be interfacing with merchant subsystem 200 via an online resource 113 running on device 100/100' (e.g., a third party application managed by merchant subsystem 200, an internet browser pointed at a site managed by a merchant of merchant subsystem 200, a telephone connection between device 100/100' and an entity of merchant subsystem 200, etc.), and the user may communicate payment device identification data 660 of a payment device with which the user would like to pay for a product or service of the merchant (e.g., as identified by potential transaction data 658) by entering and communicating that payment device identification data (e.g., device identification information 119 of payment device 100) to merchant subsystem 200 via the online resource (e.g., via communications path 15/15'). As a specific example, a user of device 100/100' may manually communicate device identification information 119 of payment device 100 (e.g., the device with secure element 145 and at least one payment credential) to merchant subsystem 200 by typing or speaking or otherwise communicating such payment device identification information 119 into the online application (e.g., as I/O input data 115i of FIG. 3). For example, as shown in FIG. 9B, GUI 180 of device 100/100' may provide screen 190b, where the online resource may indicate by information 911 that payment device identification data 660 provided by that device 100/100' for device identification information "XXXX" has been received as a desired payment source, such that the online resource may now also include a purchase prompt 913.

Alternatively, communication of payment device identification data 660 from device 100/100' to merchant subsystem 200 may be automatically carried out by device 100/100' in response to a particular request made by merchant subsystem 200 of device 100/100' for a payment method (e.g., by payment method prompt 909 of FIG. 9A) that may be satisfied by device identification information 119 of device 100 (e.g., in a default or customized setting of the online resource accessed by device 100/100', where device identification information 119 may be configured to be used as payment information to be provided to merchant subsystem 200 as data 660). As a specific example, when device 100/100' running the online resource (e.g., merchant application 113) receives potential transaction data 658 including a prompt for a payment method, that device 100/100' may be configured (e.g., by default, by user option setting, or by any other mechanism) to automatically provide payment device ID data 660 that may be representative of device identification information 119 of device 100. If device 100' is running the online resource, device 100' may be configured to automatically detect the presence of a payment device 100 (e.g., at step 609a, for example, through the use of communication components or any suitable sensor components of device 100 and device 100' if device 100 and device 100' are within a certain distance of one another in system 1, such as when device 100 is in the pocket of a user interacting with device 100' in the hand of the user). Any suitable characteristic or set of characteristics shared by device 100 and device 100' may be utilized for determining when device identification information 119 of device 100 may be accessed by device 100' for providing payment device ID data 660 at step 610 to merchant subsystem 200, including, for example, a threshold distance between devices 100 and 100', a common ownership between devices 100 and 100', particular accessibility rights between devices 100 and 100', and the like. Any suitable device interoperability techniques, such as "Continuity," "Handoff," and/or "AirDrop," as may be provided by Apple Inc., may be leveraged by system 1 such that device identification information 119 of a particular payment-enabled device 100 may be accessible (e.g., at step 609a) by an appropriate device 100' that may be interfacing with merchant subsystem 200 (e.g., via an online resource) for receiving suitable potential transaction data 658, and such that the accessed device identification information 119 of the particular payment-enabled device 100 may be used (e.g., automatically) by the appropriate device 100' as payment device ID data 660 at step 610. In some embodiments, such device identification information 119 may be indicative of more than just one device 100 (e.g., two or more devices may be associated with the same device identification information 119 (e.g., the same e-mail address or Apple ID™)), such that two or more devices may potentially receive payment request data 664 (e.g., at step 614) based on the use of such device identification information 119 at step 610. In such embodiments, a user may choose to use any of those devices to continue with the transaction (e.g., at steps 615-632). In some embodiments, at least one of such devices associated with such device identification information 119 used at step 610 may not be configured with payment capabilities, and such a device may be automatically configured to not provide a payment request to a user of that device (e.g., via a UI of that device) in response to receiving payment request data 664 (e.g., such a device may be configured to mute any such payment request). Alternatively, commercial entity subsystem 400 may be configured to determine which of the multiple devices associated with device identification information 119 provided at step 610 may or may not be configured with payment capabilities, such that commercial entity subsystem 400 may be configured to intelligently discern to which subset of those devices to send payment request data 664 at step 614.

Alternatively, as mentioned and shown in FIG. 6, payment device 100 may be running the online resource, and may receive potential transaction data 658, where the online resource may prompt device 100 to provide a payment method for funding the potential transaction (e.g., as shown by payment method prompt 909 of FIG. 9A), such that device 100 itself may provide its own device identification information 119 as payment device ID data 660 to merchant subsystem 200 at step 610. In one such example, if payment device 100 may be communicating with merchant subsystem 200 via a telephone communication online resource, a caller identification capability of merchant subsystem 200 may be configured to automatically identify the telephone number associated with payment device 100, where such a telephone number may be configured as device identification information 119 of payment device 100, and merchant subsystem 200 may be configured to automatically use that identified telephone number as payment device ID data 660 at step 610. In some embodiments, prior to providing payment device ID data 660 to merchant subsystem 200 at step 610 (e.g., by using device identification information 119 of payment-enabled device 100), temporary device identification information may be generated and used in place of device identification information 119 for defining such payment device ID data 660 (e.g., so as to add an additional layer of security to process 600). For example, at step 609b, payment device 100 and commercial entity subsystem 400 may communicate to generate and share new temporary device identification information (e.g., one-time-use or for a set duration only) to be used for defining payment device ID data 660 instead of potentially static and/or commonly shared device identification information 119 of payment-enabled device 100. That is, rather than using device identification information 119, which may be a publicly known telephone number or commercial entity user name (e.g., iTunes™/Apple ID™ account number) associated with payment-enabled device 100, device 100 may generate a random or otherwise unique new piece of identification information at step 609b for use as a replacement for device identification information 119 in defining payment device ID data 660, and device 100 may also share such information at step 609b with commercial entity subsystem 400 such that this new identification information may be linked to device 100 at commercial entity subsystem 400 (e.g., in a portion of table 430 or any other suitable data structure accessible to commercial entity subsystem 400). Alternatively, commercial entity subsystem 400 may generate a random or otherwise unique new piece of identification information at step 609b, link such new information to device 100 at commercial entity subsystem 400 (e.g., in a portion of table 430 or any other suitable data structure accessible to commercial entity subsystem 400), and share such information with payment device 100 for use as a replacement for device identification information 119 in defining payment device ID data 660. Such a link between this new information and device 100 may be maintained by commercial entity subsystem 400 for a certain period of time or for only a certain amount of uses before being deleted, such that the remainder of process 600 described below may be carried out using payment device ID data 660 that may be based on such new information but only if carried out within an appropriate amount of time (e.g., 30 minutes or less or any other suitable time frame that may provide additional security to the process) or only for a certain number of uses (e.g., 1 use).

In any event, once any suitable payment device ID data 660 indicative of any suitable device identification information that may be associated with a payment device 100 has been provided to merchant subsystem 200 at step 610 in any suitable manner by device 100 or device 100' (e.g., in response to user selection of purchase prompt 913 of screen 190b of FIG. 9B after appropriate device identification information has been communicated to the online resource at field 911), merchant subsystem 200 may be configured to generate and communicate transaction request data 662 to commercial entity subsystem 400 at step 612. Such transaction request data 662 may include information representative of the payment device identification data 660 received at step 610 (e.g., device identification information 119 for payment device 100 or a suitable temporary replacement thereof) as well as any suitable additional information that may be provided by merchant subsystem 200 for identifying one or more particular characteristics of the purchase transaction to be financed. For example, in addition to identifying the payment device identification data 660 received at step 610, transaction request data 662 that may be communicated from merchant subsystem 200 to commercial entity subsystem 400 (e.g., via path 85) may include a merchant identifier that may identify the particular merchant sending the data (e.g., a merchant identifier that may be linked by commercial entity subsystem 400 to an appropriate merchant key 157 of table 430), a transaction identifier that may identify the particular purchase transaction to be financed, one or more pieces of information specific to that transaction (e.g., purchase price, description of product/service being purchased, shipping information, etc., as may also be included in potential transaction data 658 of step 608 and/or information 907a-907d and 909 of GUI 180 of screens 190a/190b of FIGS. 9A and 9B), identification of the currency to be used during the transaction, a list of financial institutions whose credentials may be accepted by merchant subsystem 200, and/or one or more fields of customizable information that may be uniquely customized by merchant subsystem 200 for a particular transaction (e.g., additional information that may be requested by merchant subsystem 200 of the purchaser, such as a request for selection of one of several options for a complimentary gift from the merchant to the purchaser, etc. (e.g., as may be presented to a user of payment device 100 at prompt 915 of screen 190g of FIG. 9G in addition to or instead of a security code, as described below)). In some embodiments, at least a portion of such transaction request data 662 may be encrypted and/or otherwise formatted by merchant subsystem 200 using merchant key 157 before communication of such transaction request data 662 from merchant subsystem 200 to commercial entity subsystem 400 at step 612 (e.g., for creating a secure communication channel between merchant subsystem 200 to commercial entity subsystem 400, where such merchant key 157 may be identified and accessed by commercial entity subsystem 400 (e.g., via table 430) for appropriate decryption). For example, as mentioned, in some embodiments, transaction request data 662 communicated from merchant subsystem 200 to commercial entity subsystem 400 at step 612 may include a merchant identifier that may be indicative of merchant subsystem 200. Such a merchant identifier may be received and utilized by commercial entity subsystem 400 to identify a particular one of many merchant keys accessible by commercial entity subsystem 400 to use for the decryption of transaction request data 662 received at step 612 (e.g., merchant key 157 through leveraging table 430 of commercial entity subsystem 400).

Moreover, in some embodiments, once any suitable payment device ID data 660 indicative of any suitable device identification information that may be associated with a payment device 100 has been provided to merchant subsystem 200 at step 610 in any suitable manner by device 100 or device 100' (e.g., in response to user selection of purchase prompt 913 of screen 190*b* of FIG. 9B after appropriate device identification information has been communicated to the online resource at field 911), merchant subsystem 200 may be configured to generate and communicate security code data 661 at step 611 to device 100/100' (e.g., to the device that provided payment device ID data 660 to merchant subsystem 200). Such security code data 661, which may be presented to a user of device 100/100' (e.g., as security code "PQRS" at security code entry 915 of screen 190*c* of FIG. 9C, as a text message to device 100 if online resource device 100 is also the payment device and the payment device identifier and text message number is identified by a caller ID of a merchant call center, and/or as any other suitable data), may be generated by merchant subsystem 200 as any suitable code (e.g., unique code) that may be associated with any transaction information of the current payment transaction. In addition to presenting such security code data 661 to device 100/100' (e.g., to a user of device 100/100' via the online resource 113 of the merchant running on device 100/100' at screen 190*c*), merchant subsystem 200 may be configured to share such security code data 661 with commercial entity subsystem 400 as a portion of transaction request data 662 at step 612. Such security code data 661 may be utilized for providing additional security to process 600, as describe below with respect to step 615 and/or step 622 and/or step 625.

Next, at step 614, in response to receiving such transaction request data 662 from merchant subsystem 200 at step 612, commercial entity subsystem 400 may communicate payment request data 664 to electronic device 100 (e.g., to the electronic device 100 associated with the payment device identification data 660 provided at step 610). Such payment request data 664 may include any suitable information that may be provided by commercial entity subsystem 400 for identifying one or more particular characteristics of the purchase transaction to be financed. For example, in response to identifying the particular payment device 100 that is to receive such payment request data 664 (e.g., by analyzing the payment device identification data 660 communicated by merchant subsystem 200 to commercial entity subsystem 400 as a portion of transaction request data 662 at step 612 (e.g., by commercial entity subsystem 400 using a look-up table, such as table 430, or any other suitable data structure to identify a way to communicate with a particular device 100 that may be associated with that payment device identification data 660)), commercial entity subsystem 400 may generate and transmit such payment request data 664 to that device 100 at step 614 (e.g., via path 65), where such payment request data 664 may include any suitable information included in or based on the transaction request data 662 of step 612 that may identify one or more particulars of the transaction to that payment device 100. For example, like transaction request data 662 of step 612, payment request data 664 of step 614 may include a merchant identifier that may identify the particular merchant facilitating the transaction, a transaction identifier that may identify the particular purchase transaction to be financed, one or more pieces of information specific to that transaction (e.g., purchase price, description of product/service being purchased, shipping information, etc.), and/or one or more fields of customizable information that may be uniquely customized by merchant subsystem 200 for a particular transaction. In some embodiments, such payment request data 664 may be encrypted or otherwise formatted by commercial entity subsystem 400 before communication to device 100 using a commercial entity key (e.g., ISD key 156*k* and/or any other suitable access key, such as one or more of keys 151*k*, 155*a*, 155*b*, 158*k*) that may be available to commercial entity subsystem 400 and that may be associated with the target payment device 100 that is to receive such payment request data (e.g., for creating a secure communication channel between commercial entity subsystem 400 and device 100).

In some embodiments, a first substep of step 614 may enable a limited subset of payment request data 664 (or an indication thereof) to be received at device 100 and that may be configured to leverage push technology such that at least some information indicative of a payment request may generate and/or be presented as a push notification on device 100. For example, as shown in FIG. 9D, screen 190*d* may be presented on device 100 in response to receipt of such an indication of payment request data 664, which may include a message 917 (e.g., "You have a new payment request") along with one or more user options, such as "view" request option 919 and/or "hide" request option 921. In response to a user selection of "view" option 919, device 100 may be configured to send a request to commercial entity subsystem 400 for all suitable information of payment request data 664, which, when transmitted by commercial entity subsystem 400 (e.g., as another substep of step 614) and received by device 100, may be configured to present an initial payment screen 190*e* of FIG. 9E on device 100, which may present any suitable information to a user of device 100 based on payment request data 664. Therefore, push technology may not be utilized for sending or presenting all applicable data for a payment request of payment request data 664, but instead may be used as more of a low bandwidth "tap on the shoulder" to payment device 100 requesting that device 100 check in with commercial entity subsystem 400 to acquire pending payment request data 664 for a particular payment process. For example, initial payment screen 190*e* may include any suitable information 907*a*-907*d* specific to that transaction (e.g., purchase price, description of merchant and product/service being purchased, shipping information, etc., as may also be included in payment request data 664). Moreover, as shown, screen 190*e* of FIG. 9E may prompt a user to interact with payment device 100 in one or more ways to choose a specific credential available to device 100 for making the purchase. As shown, screen 190*e* may include a credential selection prompt 923 that may enable a user to select one of potentially multiple credentials provisioned on device 100 (e.g., the credential of credential SSD 154*a*). Prompt 923 may only include credentials that are associated with payment networks supported by the merchant (e.g., as may be determined by payment request data 664, as mentioned above).

Next, at step 615, process 600 may include receiving intent and authentication by a user of payment device 100 to utilize a specific credential for carrying out a financial transaction for a particular merchant, product, price, and shipping destination based on potential transaction data 660. For example, as shown in FIG. 9G, output display component 112*a* may be configured to provide screen 190*g* in response to receiving user selection of a credential from credential selection prompt 925 of screen 190e of FIG. 9E (e.g., credential X of prompt 925 rather than credential Y of prompt 927). Screen 190g of FIG. 9G may prompt a user to interact with device 100 in one or more ways to authenticate the user and its intent to utilize the selected credential. This may include prompting the user (e.g., with an authentication prompt 933) to enter user authentication via personal identification number ("PIN") entry or via user interaction with a biometric sensor in order to access the secure element of device 100 and, thus, the credential to be used for the purchase. Access SSD 154b may leverage applet 153b to determine whether such authentication has occurred before allowing other SSDs 154 (e.g., credential SSD 154a) to be used for enabling its credential information in a commerce credential data communication. As just one example of step 615, applet 153b of access SSD 154b may be configured to determine intent and local authentication of a user of device 100 (e.g., via one or more input components 110, such as a biometric input component 110i of FIG. 4, as may be used by a user interacting with a payment application of device 100 via GUI 180) and, in response to such a determination, may be configured to enable another particular SSD for conducting a payment transaction (e.g., with a credential of credential SSD 154a).

In some embodiments, at step 615, payment device 100 may be configured to prompt a user of device 100 for a security code (e.g., at prompt 931 of screen 190f of FIG. 9F, which may be provided before, during, or after selection of a particular credential but before selecting authenticate prompt 933 of screen 190g of FIG. 9G). For example, as shown by entry 915 of screen 190g of FIG. 9G, a user of payment device 100 may be able to enter a security code "PQRS" (e.g., as originally provided by merchant subsystem 200 via online resource 113 of device 100/100' at screen 190c of FIG. 9C to a user of device 100/100). Such an entry may later be used by commercial entity subsystem 400 (e.g., at step 622) and/or merchant subsystem 200 (e.g., at step 625) to confirm that it matches the security code provided at step 611, thereby providing an additional layer of security to process 600, as this may ensure that a user interacting with online resource 113 of device 100/100' at step 610/611 is the same as or a trusted contact of the user interacting with payment device 100 at step 615.

Next, at steps 616-618, once a user has provided intent and authentication for a selected credential at step 615 (e.g., with or without use of a security code at entry 915 of screen 190g), process 600 may include device 100 generating, encrypting, and transmitting commercial entity credential data 665 for use by commercial entity subsystem 400. Once the credential of credential SSD 154a on a secure element of device 100 has been selected, authenticated, and/or enabled for use in a financial transaction (e.g., at step 615), the secure element of device 100 (e.g., processor module 142 of NFC component 120) may encrypt that credential data for use by commercial entity subsystem 400. For example, secure element ("SE") credential data 665 of credential SSD 154a (e.g., applet data 153a) may be encrypted with credential key 155a' at step 616 as encrypted SE credential data 666, such that the encrypted SE credential data 666 may only be decrypted by an entity with access to that credential key 155a' (e.g., financial institution subsystem 350) for accessing SE credential data 665. That SE credential data 665 may include all data necessary to make a payment with that credential, such as, for example, a primary account number (e.g., an actual F-PAN or a virtual D-PAN), a card security code (e.g., a card verification code ("CVV")), expiration date, name associated with the credential, and/or the like. Once some or all of that SE credential data 665 of credential SSD 154a has been encrypted with credential key 155a' at step 616 as encrypted SE credential data 666, that encrypted SE credential data 666, either alone or along with at least a first portion of payment request data 664 (e.g., a first portion of payment request data 664 that may include identification of the transaction, identification of the merchant, identification of the price, and/or identification of the product/service) and/or any other suitable information (e.g., any information identifying device 100 itself, the security code provided by a user of payment device 100 at entry 915 of screen 190g, and/or any user response data provided in response to any supplemental merchant requests as may be identified by transaction request data 662 and payment request data 664 and presented to a user of payment device 100 (e.g., on one or more of screens 190d-190g, such as a response that may be provided for a question at prompt 915 of screen 190g of FIG. 9G in addition to or instead of a security code))), may be encrypted by access information (e.g., by access key 155a of SSD 154a, access key 155b of access SSD 154b, ISD key 156k, and/or CRS 151k and/or signed by CASD 158k) at step 617 as encrypted commercial entity ("CE") credential data 667. For example, secure element 145 of device 100 (e.g., processor module 142 of NFC component 120) may use access information to encrypt not only an identification of the merchant from data 664 (e.g., identification of the merchant or its resource being used for the purchase, such as application 113), but also the identification of the amount of the purchase and/or currency code from data 664, as well as the encrypted SE credential data 665 of SSD 154a (e.g., encrypted SE credential data 666) into encrypted commercial entity credential data 667. In some embodiments, such identification of the merchant from data 664 may first be converted by the secure element into a format that may be utilized by a protocol of the secure element (e.g., from a plaintext merchant identification format that may be variable in length as may be provided from transaction data 664 into a hashed merchant identification format of a fixed length that may be suitably encrypted by the secure element).

Next, encrypted commercial entity credential data 667 along with any additional information, such as any information included in or based on at least some of payment request data 664 (e.g., identification of the merchant, identification of the price, and/or identification of the product/ service) and/or any other suitable information (e.g., any information identifying device 100 itself and/or the merchant in unencrypted form and/or the security code provided by a user of payment device 100 and/or any user data in response to customizable merchant request information), may together be transmitted as commercial entity transaction data 668 from device 100 to commercial entity subsystem 400 at step 618. Therefore, at least portions of commercial entity transaction data 668 (e.g., encrypted commercial entity credential data 667) may only be decrypted by an entity with access to that access information used for the encryption (e.g., access key 155a, access key 155b, ISD key 156k, CRS 151k, and/or CASD 158k) that generated encrypted commercial entity credential data 667 of commercial entity transaction data 668 (e.g., commercial entity subsystem 400). Such commercial entity transaction data 668 may be generated at steps 616-618 and then transmitted to commercial entity subsystem 400 at step 618 (e.g., from the secure element of NFC component 120, via communications component 106 and communication path 65). Steps 616, 617, and 618 may ensure that any credential data generated and transmitted from the secure element of device 100 as part of commercial entity transaction data 668 has first been encrypted in such a way that it cannot be decrypted by another portion of device 100. That is, SE credential data 665 of commercial entity transaction data 668 may be encrypted as encrypted SE credential data 666 with a credential key 155a' that may not be exposed to or accessible by any portion of device 100 outside of its secure element. Moreover, such encrypted SE credential data 666 of commercial entity transaction data 668 may be encrypted as encrypted commercial entity credential data 667 with an access key (e.g., access key 155a, 155b, 156k, 151k, and/or 158k (e.g., referred to herein as "access information")) that may not be exposed to or accessible by any portion of device 100 outside of its secure element. In some embodiments, commercial entity transaction data 668 may include a transaction identifier that may be known to commercial entity subsystem 400 (e.g., as initially provided to device 100 as a portion of payment request data 664, which may be based on a transaction identifier that may be initially generated by merchant subsystem 200 and provided to commercial entity subsystem 400 as a portion of transaction request data 662). Such a transaction identifier may be signed by device 100 as a portion of commercial entity transaction data 668 for authentication by commercial entity subsystem 400.

Next, at step 620, process 600 may include commercial entity subsystem 400 receiving and decrypting at least a portion of commercial entity transaction data 668. For example, commercial entity subsystem 400 may receive commercial entity transaction data 668 and may then decrypt encrypted commercial entity credential data 667 of commercial entity transaction data 668 using access information (e.g., 155a, 155b, 156k, 151k, and/or 158k) as available at commercial entity subsystem 400. This may enable commercial entity subsystem 400 to determine an unencrypted identification of the merchant (e.g., from decrypted commercial entity credential data 667), while also maintaining SE credential data 665 in an encrypted state (e.g., as encrypted SE credential data 666), because commercial entity subsystem 400 may not have access to credential key 155a' with which such SE credential data 665 may have been encrypted by the secure element of device 100 at step 616 as encrypted SE credential data 666. Additionally or alternatively, the merchant may be identified by the additional data that may have been included in commercial entity transaction data 668 along with encrypted commercial entity credential data 667. Commercial entity transaction data 668 may include information identifying device 100 or at least its secure element, such that, when data 668 is received by commercial entity subsystem 400, commercial entity subsystem 400 may know which access information (e.g., which of access information 155a, 155b, 156k, 151k, and/or 158k) to use at step 620. For example, commercial entity subsystem 400 may have access to multiple access keys 155a/155b and/or multiple ISD keys 156k, each one of which may be particular to a specific device 100 or to a specific secure element.

Next, at step 621, process 600 may include commercial entity subsystem 400 identifying a merchant key 157 associated with the merchant that may have been identified from commercial entity transaction data 668 or otherwise (e.g., via the merchant identifier of transaction request data 662) and then re-encrypting at least a portion of commercial entity credential data 668 using that merchant key 157. That is, after decrypting at least a first portion of commercial entity transaction data 668 using suitable access information at step 620 (e.g., after decrypting encrypted CE credential data 667 to realize encrypted SE credential data 666 and any other information that may have been encrypted in encrypted CE credential data 667), commercial entity subsystem 400 may then, at step 621, re-encrypt at least a second portion of commercial entity transaction data 668 (e.g., encrypted SE credential data 666) with an appropriate merchant key 157 that may be associated with merchant subsystem 200 (e.g., via merchant information identified in commercial entity transaction data 668 or otherwise as associated with the transaction). Such a merchant key 157 may be determined by comparing the merchant information identified (e.g., from commercial entity transaction data 668) with data in table 430 of FIG. 1A. With this determined appropriate merchant key 157, commercial entity subsystem 400 may re-encrypt with merchant key 157 at least a portion of commercial entity transaction data 668 as encrypted merchant credential data 671 at step 621. For example, encrypted merchant credential data 671 may include at least the encrypted SE credential data 666 from commercial entity transaction data 668 as well as the purchase amount data or other suitable transaction data from or based on commercial entity transaction data 668 and/or transaction request data 662 (e.g., data that may have been initially identified from transaction data 662). The merchant identification information from commercial entity transaction data 668 may not need to be included in encrypted merchant credential data 671 as that merchant identification may have already been used to determine the merchant key 157 with which encrypted merchant credential data 671 may be encrypted at step 621. Encrypted merchant credential data 671 may be signed by commercial entity subsystem 400 in such a way that, when received by merchant subsystem 200, may establish commercial entity subsystem 400 as the creator of such encrypted merchant credential data 671 and/or may let merchant subsystem 200 ensure that encrypted merchant credential data 671 has not been modified after being signed. Such encrypted merchant credential data 671 may be generated at steps 620 and 621 and then transmitted to merchant subsystem 200 along with any other suitable data as online based communication 672 at step 622 (e.g., from server 410 of commercial entity subsystem 400 to merchant server 210 of merchant subsystem 200 via path 85 of FIG. 1A). In some embodiments, prior to transmitting communication 672 at step 622, commercial entity subsystem 400 may be configured to detect security code data provided by a user of device 100 from commercial entity transaction data 668 and may compare such security code data from device 100 with any security code data provided by merchant subsystem (e.g., as a portion of transaction request data 662), so as to confirm that they are the same before transmitting communication 672 to merchant subsystem 200, otherwise, commercial entity subsystem 400 may request new security code data from device 100 or generate an error message for re-starting process 600 from any suitable point. In some other embodiments, commercial entity subsystem 400 may include security code data provided by a user of device 100 from commercial entity transaction data 668 as a portion of online based communication 672 sent to merchant subsystem 200 for use by merchant subsystem 200 (e.g., as described below).

Steps 620, 621, and 622 may ensure that credential data transmitted from the commercial entity subsystem 400 as part of online based communication 672 of FIG. 1A (e.g., credential data of encrypted merchant credential data 671 of online based communication 672) may be encrypted in such a way that it cannot be decrypted by an entity other than merchant subsystem 200. That is, online based communication 672 may be encrypted with a merchant key 157 that may not be exposed to or otherwise accessible by any portion of device 100, including, in some embodiments, its secure element. Moreover, credential data of online based communication 672 (e.g., encrypted SE credential data 666 of encrypted merchant credential data 671 of online based communication 672) may be encrypted with a credential key 155a' that may not be exposed to or otherwise accessible by any portion of device 100 outside of its secure element.

Once such online based communication 672 is received by merchant subsystem 200 (e.g., from commercial entity subsystem 400 directly at step 622 or otherwise (e.g., via device 100/100')), process 600 may include step 624 at which merchant subsystem 200 may send confirmation data 674 to device 100 (e.g., via communication path 15 of FIG. 1A). Such confirmation data 674 may be received by device 100 to indicate to a user of device 100 that the user's payment instructions have been received by merchant subsystem 200. After a user of device 100 may provide intent and authentication to utilize a specific credential for carrying out a financial transaction based on payment request data 664 at step 615, the remaining steps of process 600 may occur transparent to the user. That is, once the user provides authentication and intent at step 615, steps 616-624 as well as steps 625-632 may occur without any further user interaction and may seem instantaneous to a user, whereby process 600 may appear to a user as if, after step 615, credential data is automatically and instantaneously sent to merchant subsystem 200 and confirmed at step 624 and/or step 632 (described below).

Moreover, once such online based communication 672 is received by merchant subsystem 200, process 600 may also include step 625 at which merchant subsystem 200 may be configured to generate and transmit payment data 675 to acquiring bank subsystem 300 (e.g., via communication path 25 between merchant subsystem 200 and acquiring bank subsystem 300 of FIG. 1A), where data 675 may include payment information and an authorization request that may be indicative of the user's commerce credential and the merchant's purchase price for the product or service (e.g., as included in online based communication 672 or as otherwise associated with the transaction as known by merchant subsystem 200 (e.g., by transaction data 658)). For example, at step 625, merchant subsystem 200 may leverage its known merchant key 157 to at least partially decrypt online based communication 672, such that payment data 675 may include the SE credential data 665 of credential SSD 154a encrypted with its credential key 155a' (e.g., encrypted SE credential data 666) but not with a key that is not available to financial institution subsystem 350. In some embodiments, prior to transmitting payment data 675, merchant subsystem 200 may be configured to detect security code data provided by a user of device 100 from online based communication 672 and may compare such security code data from device 100 with any security code data previously generated by merchant subsystem 200 for the transaction (e.g., as security code data 661), so as to confirm that they are the same before transmitting payment data 675 to acquiring bank subsystem 300, otherwise, merchant subsystem 200 may request new security code data from device 100 (e.g., via commercial entity subsystem 400) or generate an error message for re-starting process 600 from any suitable point. Moreover, in some embodiments, at step 625, merchant subsystem 200 may be configured to receive and analyze any user response data that may have been provided by a user of payment device 100 in response to any supplemental merchant requests (e.g., a response that may have been provided for a question at prompt 915 of screen 190g of FIG. 9G in addition to or instead of a security code) and included in data 668 and online based communication 672.

If payment data 675 is transmitted to acquiring bank subsystem 300, then, at step 626, acquiring bank subsystem 300 may forward the authorization request from data 675 to financial institution subsystem 350 as authorization request data 676 (e.g., via communication path 35 between acquiring bank subsystem 300 and financial institution subsystem 350 of FIG. 1A). Next, at step 628, when issuing bank subsystem 370 of financial institution subsystem 350 receives an authorization request (e.g., directly from acquiring bank subsystem 300 as data 676 at step 626, or indirectly via payment network subsystem 360 as data 405, as described above), the payment information (e.g., SE credential data 665 of device 100 as encrypted by credential key 155a' by the secure element of device 100 (e.g., encrypted SE credential data 666)) and the purchase amount, each of which may be included in the authorization request data 676, as well as in data 667, 668, 672, and/or 675, may be decrypted (e.g., using credential key 155a' at financial institution subsystem 350) and analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 678 at step 628 of process 600 (e.g., directly from issuing bank subsystem 370 to acquiring bank subsystem 300 via communication path 35, or from payment network subsystem 360 to acquiring bank subsystem 300 based on authorization response data 415 that may be provided to payment network subsystem 360 from issuing bank subsystem 370 via communication path 45 of FIG. 1A). Next, in response to receiving authorization response data 678 at step 628, process 600 may also include acquiring bank subsystem 300 or any other suitable subsystem sharing such authorization response data with merchant subsystem 200 as authorization response data 680 at step 630, which may then be shared with online resource electronic device 100/100' and/or payment electronic device 100 as authorization response data 682 at step 632. Such authorization response data 682 may be configured to provide any suitable confirmation data to device 100 and/or 100', such as confirmation data 935 of screen 190h of FIG. 9H.

Therefore, merchant subsystem 200 may be configured to process online-based communication 672 received from commercial entity subsystem 400 at step 622 in any suitable way. For example, to obtain payment credentials from such an online-based communication (e.g., SE credential data 666), merchant subsystem 200 may verify that a signature property of the received data is valid and that commercial entity subsystem 400 is the signer of that signature. Merchant subsystem 200 may use any suitable technique to determine which merchant key (e.g., which merchant public key 157) may have been used by commercial entity subsystem 400 to construct the encrypted merchant credential data (e.g., data 671). Then, merchant subsystem 200 may retrieve the corresponding merchant private key (e.g., merchant private key 157 at merchant subsystem 200) and use that retrieved key to de-encapsulate and/or decrypt encrypted merchant credential data 671 to recover encrypted SE credential data 666. Then such data 666 may be provided to the appropriate payment network 360, which may leverage the appropriate credential key 155a' of financial institution subsystem 350 to de-encapsulate and/or decrypt encrypted SE credential data 666 to recover SE credential data 665 (e.g., to recover the plain text payment information for the payment credential, such as full EMV ("Europay Master-Card Visa") payment data).

In some embodiments, once payment device 100 is ready to prepare CE transaction data (e.g., data 665) to commercial entity subsystem 400 for a new online resource transaction (e.g., after step 615) but before doing so, device 100 may be configured to request certain data from commercial entity subsystem 400. For example, prior to step 616 but after step 614, device 100 may request certain CE feature information (e.g., an unpredictable number or other suitable data) that may be leveraged by device 100 and process 600 for adding an additional layer of security to process 600. For example, in response to such a request, such CE feature information may be provided from commercial entity 400 to device 100 (e.g., at a step (not shown) before step 616), and such CE feature information may be encrypted along with other data by secure element 145. For example, such CE feature information may be encrypted along with SE credential data 665 as encrypted SE credential data 666 at step 616. Alternatively or additionally, such CE feature information may be encrypted along with encrypted SE credential data 666 as encrypted CE credential data 667 at step 617. In any event, such CE feature information may be included in CE transaction data 668 to commercial entity subsystem 400 and may be accessed by commercial entity subsystem 400 and compared to the CE feature information it generated earlier to confirm a match or determine any potential fraudulent behavior (e.g., if such CE feature information were encrypted at step 617). Additionally or alternatively, such CE feature information may be included in CE transaction data 668 and in communication 672 such that it may be received by merchant subsystem 200 to add another layer of security on which merchant subsystem 200 may rely when determining that communication 672 is not fraudulent and may be used for conducting a financial transaction.

Process 600 may ensure that system 1 may leverage security keys accessible to a security element of device 100 so as to securely communicate credential data to merchant subsystem 200 for use by financial institution subsystem 350 while enabling certain keys to be properly managed by commercial entity subsystem 400. That is, secure element 145 of device 100 (e.g., NFC component 120) may contain credential key 155a' and access information (e.g., 155a, 155b, 156k, 151k, and/or 158k), commercial entity subsystem 400 may contain access information (e.g., 155a, 155b, 156k, 151k, and/or 158k) and merchant key 157, merchant subsystem 200 may contain merchant key 157, and financial institution subsystem 350 may contain credential key 155a'. Due to the fact that device 100 and commercial entity subsystem 400 may each contain or have access to access information (e.g., 155a, 155b, 156k, 151k, and/or 158k), payment device 100 may securely share encrypted credential data with commercial entity subsystem 400 (e.g., as data 668 at step 618). Similarly, due to the fact that commercial entity subsystem 400 and merchant subsystem 200 may each contain or have access to merchant key 157, commercial entity subsystem 400 may securely share encrypted credential data with merchant subsystem 200 (e.g., as data 672 at step 622). Then, merchant subsystem 200, via acquiring bank subsystem 300, may share this encrypted credential data with financial institution subsystem 350 that may finally decrypt the encrypted credential data with credential key 155a'. However, in some embodiments, none of the credential data of the secure element of payment device 100 (e.g., SE credential data 665 of applet 153a of SSD 154a) may be shared with a non-secure element of device 100 (e.g., processor 102 and/or communications component 106) in a decrypted state, nor may credential key 155a' be made available to such a non-secure element of device 100. Credential key 155a' may be managed by financial institution subsystem 350, while certain access information (e.g., 155a, 155b, 156k, 151k, and/or 158k) may be managed by or otherwise accessible to commercial entity subsystem 400, while merchant key 157 may be managed by commercial entity subsystem 400 and/or merchant subsystem 200, such that each of these keys may be maintained and/or updated and/or deleted as needed to maintain their effectiveness. Therefore, merchant key 157 may never be stored on or otherwise accessible to device 100. For example, merchant key 157 may not even be stored on a secure element of device 100. Merchant key 157 can be revocable or may expire after a certain amount of time, which may require merchant subsystem 200 and commercial entity subsystem 400 to communicate every so often to manage and/or update merchant key 157. This may enable commercial entity subsystem 400 to dictate which merchant subsystems 200 may be able to conduct online transactions using secure credentials of device 100. Moreover, certain access information (e.g., 155a, 155b, 156k, 151k, and/or 158k) may never be stored on or otherwise accessible to merchant subsystem 200. For example, certain access information can be revocable or may expire after a certain amount of time, which may require payment device 100 and commercial entity subsystem 400 to communicate every so often to manage and/or update such access information. This may enable commercial entity subsystem 400 to dictate which payment devices 100 may be able to conduct online transactions using secure credentials of device 100 with a merchant subsystem 200 via commercial entity subsystem 400.

Therefore, process 600 may enable at least one credential provisioned on a secure element of payment device 100 to be securely used for an online payment transaction with merchant subsystem 200. Process 600 may be configured to provide a virtualized tunnel between the secure element of payment device 100 and merchant subsystem 200 that may transport a highly secure, EMV ("Europay, MasterCard, Visa") standard-level (e.g., "Chip and PIN") data set of credential data for use in a financial transaction. By only trusting data within the secure element of payment device 100 and not any data or components of device 100 off of such a secure element (e.g., processor 102 or application 103 or application 113 local to device 100), process 600 may require that any credential data transmitted out of the secure element (e.g., SE credential data 665 of applet 153a) be encrypted with a credential key 155a' that may only be known by the secure element and financial institution subsystem 350 (e.g., as encrypted SE credential data 666 at step 616), and, in some embodiments, then encrypted with access information (e.g., 155a, 155b, 156k, 151k, and/or 158k) that may only be known by secure element 145 and commercial entity subsystem 400 (e.g., as encrypted commercial entity credential data 667 at step 617). Commercial entity subsystem 400 may then leverage this data 667 (e.g., as part of received commercial entity transaction data 668) and its knowledge of such access information (e.g., 155a, 155b, 156k, 151k, and/or 158k) and merchant key 157 to decrypt/re-encrypt (e.g., at steps 620/621) the credential data transmitted by device 100 for later use by merchant subsystem 200. By providing commercial entity subsystem 400 in the middle of process 600, an extra layer of security is realized. Commercial entity subsystem 400 may be privy not only to certain access information (e.g., 155a, 155b, 156k, 151k, and/or 158k) shared by secure element 145 of device 100 but also to merchant key 157 shared by merchant subsystem 200. Therefore, commercial entity subsystem 400 may be in a unique position to manage any online transactions between the secure element of device 100 and merchant subsystem 200, while at the same time not being privy to the credential data being used (e.g., not being privy to SE credential data 665 of applet 153a that may be encrypted as encrypted SE credential data 666 at step 616 by credential key 155a', for example, because commercial entity subsystem 400 may not have access to credential key 155a'). Moreover, in some embodiments, commercial entity subsystem 400 may be configured to determine how to contact payment device 100 (e.g., with payment request data 664 at step 614) based on a payment device identifier for that payment device 100 (e.g., identifier 119 as may be provided to commercial entity subsystem 400 as at least a portion of transaction request data 662 from merchant subsystem 200 at step 612). For example, even if merchant subsystem 200 itself may not be configured to determine how to directly contact payment device 100 based on such a payment device identifier for that payment device 100 (e.g., when the payment device identifier for that payment device 100 is not a telephone number of that device 100 but rather a unique number only known to the user of device 100, any trusted user of device 100', and commercial entity subsystem 400 (e.g., an iTunes™ account number/Apple ID™ or some other number that may be generated by a manufacturer of device 100 and accessible to its user (e.g., a temporary payment device identifier of step 609b))), commercial entity subsystem 400 may be configured to determine how to contact payment device 100 for enabling process 600 while providing an additional layer of security. For example, in some embodiments, commercial entity subsystem 400 may maintain a table (e.g., table 430) that may associate telephone numbers, account numbers, e-mail addresses, or any other suitable data that may be unique to one or more payment devices 100 with more transient or temporary or private data that may only be known to commercial entity subsystem 400 and payment device 100 (e.g., via communication at step 609b) such that a payment device identifier provided to merchant subsystem 200 and then communicated to commercial entity subsystem 400 by that merchant subsystem 200 may then be utilized in conjunction with that table by commercial entity subsystem 400 to identify the appropriate payment device 100 and how to contact it. Any suitable identification data associated with a device 100 may be utilized as device identification information 119 (e.g., for payment device ID data 660), including, but not limited to, telephone numbers, e-mail addresses, user names of certain accounts (e.g., Apple ID™ accounts, any contact information associated with an iMessage™ account as may be provided by Apple Inc. or any other suitable account or communication mechanism). Commercial entity subsystem 400 may leverage a table (e.g., table 430) to associate any particular device identification information 119 (e.g., as may be received via transaction request data 662 from merchant subsystem 200 (e.g., via payment device ID data 660 from device 100/100')) with a communication mechanism preferred by commercial entity subsystem 400 to contact that particular device 100 (e.g., via push technology).

Commercial entity subsystem 400 may be configured to provide a validation check after receiving commercial entity transaction data 668 but before providing online communication 672 (e.g., at steps 620/621). For example, commercial entity subsystem 400 may determine that received commercial entity transaction data 668 identifies a merchant whose merchant key 157 has expired or has otherwise been terminated or not recognized (e.g., by table 430). Therefore, if commercial entity subsystem 400 at some point before step 620/621 determines that a particular merchant is no longer trustworthy, commercial entity subsystem 400 may remove or otherwise disable its merchant key 157 from table 430, such that, when a merchant associated with that key 157 is later identified by commercial entity subsystem 400 from a received commercial entity transaction data 668 provided by an electronic device 100 or otherwise (e.g., via data 662 at step 612), commercial entity subsystem 400 may not provide any online communication 672, thereby preventing the desired financial transaction. Alternatively, a merchant identified in commercial entity transaction data 668 received from an electronic device 100 may never have had a merchant key 157 associated with table 430, such that commercial entity subsystem 400 may realize that commercial entity transaction data 668 (or transaction request data 662) may be an attempt to conduct a financial transaction with a merchant that is not recognized by commercial entity subsystem 400 and, thus, commercial entity subsystem 400 may prevent the transaction from being carried out. However, if process 600 is able to be completed, not only may commercial entity subsystem 400 be satisfied that the financial transaction is between a known device 100 (e.g., due to shared access information (e.g., 155a, 155b, 156k, 151k, and/or 158k)) and a known merchant subsystem 200 (e.g., due to a known merchant key 157), but merchant subsystem 200 may also be satisfied that the financial transaction is being conducted with a trusted device 100.

Commercial entity subsystem 400 may be configured to utilize certain merchant-specific data that may be provided to commercial entity subsystem 400 from merchant subsystem 200 by transaction request data 662 in order to validate merchant subsystem 200 so as to allow certain portions of process 600. In some embodiments, commercial entity subsystem 400 may access certain banking information associated with merchant subsystem 200 such that commercial entity subsystem 400 may be enabled to charge merchant subsystem 200 a fee (e.g., a percentage of the purchase price for the transaction being facilitated or a set fee for each facilitated transaction). In some embodiments, in response to receipt of transaction request data 662, commercial entity subsystem 400 may be configured to respond to merchant subsystem 200 with information about the status of process 600, such as (1) whether or not the payment device identifier data of transaction request data 662 is associated with a payment device 100 known to commercial entity subsystem 400, such that commercial entity subsystem 400 may let merchant subsystem 200 know whether steps 614 and later steps are even possible, and/or (2) that commercial entity subsystem 400 has sent payment request data 664 to a known payment device 100 (e.g., at step 614) but that commercial entity subsystem 400 is still waiting for a response from that payment device (e.g., still waiting for transaction data 668 from that payment device) such that merchant subsystem 200 may know that a user has been successfully contacted.

It is understood that the steps shown in process 600 of FIG. 6 are merely illustrative and that existing steps may be modified or omitted, additional steps may be added, and the order of certain steps may be altered. For example, it is to be understood that some shared keys may be public keys while other shared keys may be private or secret keys (e.g., a mathematically linked key pair that includes a public key and a private key). A public key of a key pair may be used to encrypt data while a private key of that key pair may be used to decrypt the encrypted data. For example, access key 155a of SSD 154a and/or access key 155b of SSD 154b, which may be stored in secure element 145 of device 100, may be a public key while access key 155a and/or access key 155b available at commercial entity subsystem 400 may be an associated private key or vice versa. Additionally or alternatively, ISD key 156k of ISD 152 that may be stored in a secure element of device 100 may be a public key while ISD key 156k available at commercial entity subsystem 400 may be an associated private key or vice versa. Additionally or alternatively, CRS 151k that may be stored in a secure element of device 100 may be a public key while CRS 151k available at commercial entity subsystem 400 may be an associated private key or vice versa. Additionally or alternatively, CASD 158k that may be stored in a secure element of device 100 may be public while CASD 158k available at commercial entity subsystem 400 may be private or vice versa. Additionally or alternatively, merchant key 157 of table 430 or elsewhere at commercial entity subsystem 400 may be a public key while merchant key 157 available at merchant subsystem 200 may be an associated private key or vice versa. Moreover, certain data may be signed by a component transmitting that data. For example, commercial entity transaction data 668 may be signed by device 100 before being transmitted to commercial entity subsystem 400 at step 618 or encrypted commercial entity credential data 667 may be signed by the secure element at step 617 (e.g., by CASD 158k) before being transmitted as at least a portion of transaction data 668 at step 618. Such a signature by device 100 may enable commercial entity subsystem 400 to more confidently determine that data 668 was generated by a trusted device 100. Additionally or alternatively, communication 672 may be signed by commercial entity subsystem 400 before being transmitted to merchant subsystem 200 at step 622. Such a signature by commercial entity subsystem 400 may enable device 100 and/or merchant subsystem 200 to more confidently determine that communication 672 was generated by a trusted commercial entity subsystem 400.

It is to be understood that device 100 need not be configured to handle NFC communications or any other contactless proximity-based communications with another device (e.g., an NFC communication with a merchant terminal of merchant subsystem 200). Instead, device 100 may include a secure element for storing credential information that may be used for online transactions, as described with respect to process 600, while not being leveraged for NFC transactions. For example, device 100 may include a secure element (e.g., with controller module 140 and/or memory module 150, but without device module 130).

Moreover, as mentioned above with respect to FIG. 5, a payment device 100 need not include any payment credential, but instead may be associated with a user account of commercial entity subsystem 400 with which a payment credential is associated, and a user of payment device 100 may authenticate that account and authorize use of that payment credential known by commercial entity subsystem 400 via certain authentication information provided by payment device 100 to commercial entity subsystem 400 (e.g., via steps similar to steps 615-618). Additionally or alternatively, as mentioned above with respect to FIG. 5, an online resource 113 need not run on payment device 100 at all, or even on device 100' that may provide payment device identification data 660 to merchant subsystem 200. Instead, such payment device identification data 660 may be provided in any suitable manner to merchant subsystem 200. For example, such payment device identification data 660 may be provided to merchant subsystem 200 automatically in response to a user of device 100/100' selecting an advertisement from merchant 200 that may be provided on device 100/100' (e.g., on any suitable website or in any suitable app running on device 100/100' (e.g., through a mobile advertising platform, such as iAd™ provided by Apple Inc.)). As another example, merchant subsystem 200 may be provided with payment device identification data 660 when a user initially signs up for a recurring service (e.g., a user may sign up for a monthly power service by a utility company merchant by providing a telephone number as payment device identification data 660 to such a merchant when enrolling with the service and such a merchant utilizes such payment device identification data 660 every month to bill the user (e.g., starting at step 612 of process 600)). By utilizing push technology, payment request data 664 may be provided to payment device 100 (e.g., at step 614) without any specific action by a user of payment device 100 (e.g., a user of payment device 100 does not have to be running an online resource associated with merchant subsystem 200). Therefore, a payment device identifier of a payment device 100 may be provided as payment device identification data 660 to a merchant subsystem 200 via any suitable user interaction with a website, a merchant application, an advertisement, a telephone conversation, an in-person conversation, an e-mail, or any other suitable method of communicating information from a user or a user's device 100/100' with a merchant server 210 or an operator/custodian of merchant subsystem 200.

As mentioned, in some embodiments, payment device 100 may share its payment device identifier (e.g., identifier 119 or a suitable temporary replacement, which may be determined at step 609b) with another device 100' such that device 100' may share that identifier as payment device ID data 660 with merchant subsystem 200, where such sharing may be enabled through automatic presence detection (e.g., via proximity or any suitable device interoperability techniques, such as "Continuity," "Handoff," and/or "AirDrop," as may be provided by Apple Inc.). Alternatively or additionally, payment device 100 may share its payment device identifier (e.g., identifier 119 or a suitable temporary replacement, which may be determined at step 609b) directly with a merchant subsystem 200 automatically or at a user's instruction in any suitable embodiments. For example, as just one exemplary situation, a user of payment device 100 may enter a restaurant or other suitable merchant arena and configure its device 100 (e.g., its telephone or other portable device) to share its payment device identifier with that restaurant for later use in any potential purchase the user may wish to make at that restaurant. For example, when such a payment device 100 is in communication with a proximity device of a merchant (e.g., an iBeacon™ of a merchant arena), device 100 may be configured to share its payment device identifier with that merchant along with any other suitable data, such as a picture or description of the user of device 100. This may increase the efficiency with which that user may be billed for services it is provided by that merchant. For example, continuing with the restaurant example, when a user enters a restaurant as detected by the user's payment device 100, payment device 100 may share its payment device identifier along with a picture of its user, such that when the merchant restaurant wants to invoice a particular user for services it has been provided at that merchant restaurant, the merchant restaurant may identify the picture of that user as provided by device 100 and then know to initiate process 600 using the payment device identifier associated with that picture (e.g., at step 612 by sending commercial entity subsystem 400 appropriate transaction request data 662 including that payment device identifier) without having to ask the user for a payment device identifier. As another example, a person waiting in line to buy a ticket to an event may enable his payment device 100 to share (e.g., broadcast) its payment device identifier any suitable distance such that any merchant receivers within that distance may be capable of receiving the payment device identifier, whereby the merchant may be configured to automatically generate and transmit transaction request data 662 including the received payment device identifier and transaction information regarding the on-sale ticket, such that payment device 100 may then be contacted by commercial entity subsystem 400 for completing a transaction for that ticket (e.g., such that a user of payment device 100 may not have to interact in any way with the ticket merchant prior to receiving contact from commercial entity subsystem 400 (e.g., as payment request data)). This may enable more efficient and automated experiences for both users of payment devices and merchants alike. Therefore, payment device identifier data may be preemptively provided to a potential merchant subsystem (e.g., automatically) by a payment device based on certain circumstances (e.g., proximity to a transmitter/sensor associated with a merchant), such that the merchant may use that payment device identifier to automatically invoice a user of the payment device without bothering the user to manually provide the payment device identifier to the merchant.

Description of FIG. 7

FIG. 7 is a flowchart of an illustrative process 700 for securely conducting payments. At step 702, process 700 may include receiving, at a commercial entity subsystem, transaction request data from a merchant subsystem, wherein the transaction request data includes a payment device identifier of a payment electronic device and transaction information related to a particular transaction. For example, as described above, commercial entity subsystem 400 may receive transaction request data 662 from merchant subsystem 200, where transaction request data 662 may include a payment device identifier 119 and transaction information related to a particular transaction (e.g., merchant identifier information, description of a product/service, purchase cost, etc.). Next, at step 704, process 700 may include transmitting, from the commercial entity subsystem, payment request data to the payment electronic device, wherein the payment request data includes at least a portion of the transaction information of the received transaction request data. For example, as described above, commercial entity subsystem 400 may transmit payment request data 664 to payment electronic device 100, where payment request data 664 may include information provided by or based on at least a portion of the transaction information of transaction request data 662. Next, at step 706, process 700 may include receiving, at the commercial entity subsystem, payment card data from the payment electronic device based on the transmitted payment request data. For example, as described above, commercial entity subsystem 400 may receive transaction data 668 from payment electronic device 100, where transaction data 668 may be based on payment request data 664. Next, at step 708, process 700 may include transmitting, from the commercial entity subsystem, at least a portion of the received payment card data to the merchant subsystem. For example, as described above, commercial entity subsystem 400 may transmit communication 672 to merchant subsystem 200, where communication 672 may include at least a portion of transaction data 668 (e.g., credential data 666).

It is understood that the steps shown in process 700 of FIG. 7 are merely illustrative and that existing steps may be modified or omitted, additional steps may be added, and the order of certain steps may be altered.

Description of FIG. 8

FIG. 8 is a flowchart of an illustrative process 800 for securely conducting payments. At step 802, process 800 may include providing an identifier of a payment electronic device to a merchant subsystem for funding a transaction. For example, as described above, device 100 and/or device 100' may provide an identifier 119 of payment electronic device 100 as at least a portion of payment device ID data 660 to merchant subsystem 200 for funding a transaction. Next, at step 804, process 800 may include receiving, at the payment electronic device, payment request data based on the transaction from a commercial entity subsystem. For example, as described above, payment electronic device 100 may receive payment request data 664 based on the transaction from commercial entity subsystem 400. Next, at step 806, process 800 may include transmitting, from the payment electronic device, payment card data to the commercial entity subsystem in response to the received payment request data. For example, as described above, payment electronic device 100 may transmit transaction data 668 to commercial entity subsystem 400 in response to received payment request data 664.

It is understood that the steps shown in process 800 of FIG. 8 are merely illustrative and that existing steps may be modified or omitted, additional steps may be added, and the order of certain steps may be altered.

Further Description of FIG. 1. FIG. 1A. FIG. 2, FIG. 3, and FIG. 4

Although not shown, commercial entity subsystem 400 of FIG. 1A may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out operations on device 100 in concert with financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1A and/or electronic device 100 via communications path 65 of FIG. 1A).

When a credential of a secure element of device 100 is appropriately enabled (e.g., commerce credential data associated with an enabled applet 153a of credential SSD 154a of NFC component 120) so as to be provided as a commerce credential data communication to merchant subsystem 200 (e.g., as a contactless proximity-based communication to a merchant terminal and/or as an online-based communication 670 to a merchant server 210), acquiring bank subsystem 300 may utilize such a commerce credential data communication for completing a financial transaction with financial institution subsystem 350. For example, after a user of electronic device 100 has chosen a product for purchase and has appropriately enabled a specific credential of device 100 to be used for payment, merchant subsystem 200 may receive an appropriate commerce credential data communication indicative of commerce credential data for the specific credential. Merchant server 210 and/or a merchant terminal may be provided by any suitable merchant or merchant agent of merchant subsystem 200 that may provide a product or service to a user of device 100 in response to device 100 providing payment credentials via such a commerce credential data communication. Based on such a received commerce credential data communication (e.g., communication 670), merchant subsystem 200 may be configured to generate and transmit data 673 to acquiring bank subsystem 300 (e.g., via a communication path 25 between merchant subsystem 200 and acquiring bank subsystem 300), where data 673 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via a commerce credential data communication (e.g., via a contactless proximity-based communication and/or via an online-based communication 670) with merchant subsystem 200. Acquiring bank subsystem 300 may then forward the authorization request from data 673 to financial institution subsystem 350 as data 674 (e.g., via a communication path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of payment network subsystem 360 and issuing bank subsystem 370 being separate entities, payment network subsystem 360 may receive the authorization request of data 674 from acquiring bank subsystem 300 and may then forward the request to issuing bank subsystem 370 as data 405 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 674 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 674 or indirectly via payment network subsystem 360 as data 405), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 676 (e.g., authorization response data 676 may be provided directly from issuing bank subsystem 370 to acquiring bank subsystem 300 via communication path 35, or authorization response data 676 may be provided from payment network subsystem 360 to acquiring bank subsystem 300 based on authorization response data 415 that may be provided to payment network subsystem 360 from issuing bank subsystem 370 via communication path 45).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of foil is, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1A), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., a merchant terminal of merchant subsystem 200).

NFC component 120 may include any suitable modules for enabling contactless proximity-based communication between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication 5.

NFC transceiver or NFC antenna 134 may be any suitable antenna or other suitable transceiver circuitry that may generally enable communication of communication from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication to subsystem 200. For example, shared antenna 116 may require amplification from booster 136 before antenna 116 (e.g., a non-loop antenna) may be properly enabled for communicating contactless proximity-based or NFC communication between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 5) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 106 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD")

152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for first SSD 154a and applet 153a of first SSD 154a may be associated with a commerce credential managed by that first payment network subsystem 360, while a second payment network subsystem 360 (e.g., MasterCard) may be the TSM for another SSD 154.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

A merchant terminal of merchant subsystem 200 of FIG. 1A may include a reader for detecting, reading, or otherwise receiving an NFC communication from electronic device 100 (e.g., when electronic device 100 comes within a certain distance or proximity of such a merchant terminal). Accordingly, it is noted that an NFC communication between such a merchant terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a merchant terminal. For instance, a reader of such a merchant terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to such a merchant terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to such a merchant terminal as an NFC communication, rather than reflect radio frequency signals, as in the case of a passive NFC device module 130. A merchant terminal may be provided by a merchant of merchant subsystem 200 (e.g., in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication between electronic device 100 and such a merchant terminal. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 4, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI")

180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific merchant application and may display screens of a specific user interface that may include one or more tools or features for interacting with device 100 in a specific manner. For each application, screens may be displayed on display output component 112a and may include various user interface elements (e.g., screens 190a-190h of FIGS. 9A-9H). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 4, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 4). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-9H may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 110*l*) may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112*a*) with graphical data to display a graphical user interface ("GUI") 180. GUI 180 may be configured to receive touch input via a touch input component 110*f*. Embodied as a touch screen (e.g., with display output component 112*a* as I/O component 114*a*), touch I/O component 110*f* may display GUI 180. Alternatively, GUI 180 may be displayed on a display (e.g., display output component 112*a*) separate from touch input component 110*f*. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110*f*, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

FURTHER APPLICATIONS OF DESCRIBED CONCEPTS

While there have been described systems, methods, and computer-readable media for securely conducting online payments, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A commercial entity system comprising:
at least one processor component;
at least one memory component; and
at least one communications component, wherein the commercial entity system is configured to:
receive transaction request data from a merchant subsystem, wherein the transaction request data comprises a payment device identifier of a payment electronic device and transaction information related to a particular transaction to be conducted between the merchant subsystem and the payment electronic device, wherein the commercial entity system is separate from both the merchant subsystem and the payment electronic device;
transmit, by the commercial entity system, payment request data to the payment electronic device identified by the payment device identifier of the transaction request data received from the merchant subsystem, wherein the payment request data comprises at least a portion of the transaction information of the received transaction request data;
receive payment card data from the payment electronic device based on the transmitted payment request data;
identify a valid key associated with the merchant subsystem;
encrypt at least a portion of the payment card data with the valid key, wherein the at least a portion of the payment card data comprises data associated with a credential applet stored on a secure element of the payment electronic device operative to identify an account for funding the particular transaction; and
transmit the encrypted at least a portion of the received payment card data to the merchant subsystem for funding the particular transaction between the merchant subsystem and the payment electronic device.

2. The commercial entity system of claim 1, wherein the commercial entity system is further configured to charge the merchant subsystem a fee based on the transmission of the at least a portion of the received payment card data to the merchant subsystem.

3. The commercial entity system of claim 1, wherein the payment device identifier comprises at least one of:
a telephone number; or an e-mail address.

4. The commercial entity system of claim 1, wherein the commercial entity system is further configured to transmit the payment request data using push technology.

5. The commercial entity system of claim 1, wherein at least a portion of the received payment card data is encrypted using a key that is accessible to the commercial entity system and is inaccessible to the merchant subsystem and the commercial entity system is further configured to decrypt the at least the portion of the encrypted payment card data using the key.

6. A method comprising:
at a commercial entity subsystem:
creating a temporary link between a payment identifier and a payment electronic device;
after the creating, receiving transaction request data from a merchant subsystem, wherein the transaction request data comprises the payment identifier and transaction information related to a particular transaction between the merchant subsystem and the payment electronic device, wherein the commercial entity subsystem is separate from the merchant subsystem and the electronic device;
in response to the receiving, determining if the payment identifier of the received transaction request data is currently linked to the payment electronic device;
when the payment identifier of the received transaction request data is determined to be currently linked to the payment electronic device, transmitting payment request data to the payment electronic device, wherein:

the payment request data comprises at least a portion of the transaction information of the received transaction request data; and the created link is maintained by the commercial entity subsystem for one of the following:
only a certain period of time after the creating; or
only a certain number of determinations that the payment identifier is linked to the payment electronic device;

receiving payment card data from the payment electronic device based on the transmitted payment request data; and transmitting at least a portion of the received payment card data to the merchant subsystem for funding the particular transaction between the merchant subsystem and the payment electronic device.

7. The method of claim 6, further comprising, at the commercial entity subsystem, charging the merchant subsystem a fee based on the transmitting the at least a portion of the received payment card data to the merchant subsystem.

8. The method of claim 6, wherein the transmitting the payment request data comprises using push technology.

9. The method of claim 6, wherein the payment identifier is not any one of:
a telephone number; or an e-mail address.

10. The method of claim 6, wherein at least a portion of the received payment card data is encrypted using a key that is accessible to the commercial entity subsystem and is inaccessible to the merchant subsystem, and the method further comprises, at the commercial entity subsystem:
decrypting the at least the portion of the encrypted payment card data using the key.

11. A device comprising:
a memory; and at least one processor configured to:
receive, by a commercial entity system, transaction request data from a merchant subsystem, wherein the transaction request data comprises a payment device identifier of a payment electronic device and transaction information related to a particular transaction to be conducted between the merchant subsystem and the payment electronic device, wherein the commercial entity system is separate from both the merchant subsystem and the payment electronic device;
transmit, by the commercial entity system, payment request data to the payment electronic device identified by the payment device identifier of the transaction request data received from the merchant subsystem, wherein the payment request data comprises at least a portion of the transaction information of the received transaction request data;
receive payment card data from the payment electronic device based on the transmitted payment request data;
identify a valid key associated with the merchant subsystem;
encrypt at least a portion of the payment card data with the valid key, wherein the at least a portion of the payment card data comprises data associated with a credential applet stored on a secure element of the payment electronic device operative to identify an account for funding the particular transaction; and
transmit the encrypted at least a portion of the received payment card data to the merchant subsystem for funding the particular transaction between the merchant subsystem and the payment electronic device.

12. The device of claim 11, wherein the at least one processor is further configured to charge the merchant subsystem a fee based on the transmission of the at least a portion of the received payment card data to the merchant subsystem.

13. The device of claim 11, wherein the payment device identifier comprises at least one of:
a telephone number; or an e-mail address.

14. The device of claim 11, wherein the commercial entity system is further configured to transmit the payment request data using push technology.

15. The device of claim 11, wherein at least a portion of the received payment card data is encrypted using a key that is accessible to the commercial entity system and is inaccessible to the merchant subsystem and the at least one processor is further configured to decrypt the at least the portion of the encrypted payment card data using the key.

16. A non-transitory machine-readable medium comprising instructions that, when executed by one or more processors, cause the one or more processors to perform operations comprising:
receiving, by a commercial entity system, transaction request data from a merchant subsystem, wherein the transaction request data comprises a payment device identifier of a payment electronic device and transaction information related to a particular transaction to be conducted between the merchant subsystem and the payment electronic device, wherein the commercial entity system is separate from both the merchant subsystem and the payment electronic device;
transmitting, by the commercial entity system, payment request data to the payment electronic device identified by the payment device identifier of the transaction request data received from the merchant subsystem, wherein the payment request data comprises at least a portion of the transaction information of the received transaction request data;
receiving payment card data from the payment electronic device based on the transmitted payment request data;
identifying a valid key associated with the merchant subsystem;
encrypting at least a portion of the payment card data with the valid key, wherein the at least a portion of the payment card data comprises data associated with a credential applet stored on a secure element of the payment electronic device operative to identify an account for funding the particular transaction; and
transmitting the encrypted at least a portion of the received payment card data to the merchant subsystem for funding the particular transaction between the merchant subsystem and the payment electronic device.

17. The non-transitory machine-readable medium of claim 16, wherein the operations further comprise charging, by the commercial entity system, the merchant subsystem a fee based on the transmission of the at least a portion of the received payment card data to the merchant subsystem.

18. The non-transitory machine-readable medium of claim 16, wherein the payment device identifier comprises at least one of:
a telephone number; or an e-mail address.

19. The non-transitory machine-readable medium of claim 16, wherein the transmitting, by the commercial entity system, payment request data to the payment electronic device comprises transmitting, by the commercial entity system, transmit the payment request data using push technology.

20. The non-transitory machine-readable medium of claim 16, wherein at least a portion of the received payment card data is encrypted using a key that is accessible to the commercial entity system and is inaccessible to the merchant subsystem and the operations further comprise decrypting, by the commercial entity system, the at least the portion of the encrypted payment card data using the key.

\* \* \* \* \*